Figure 1:
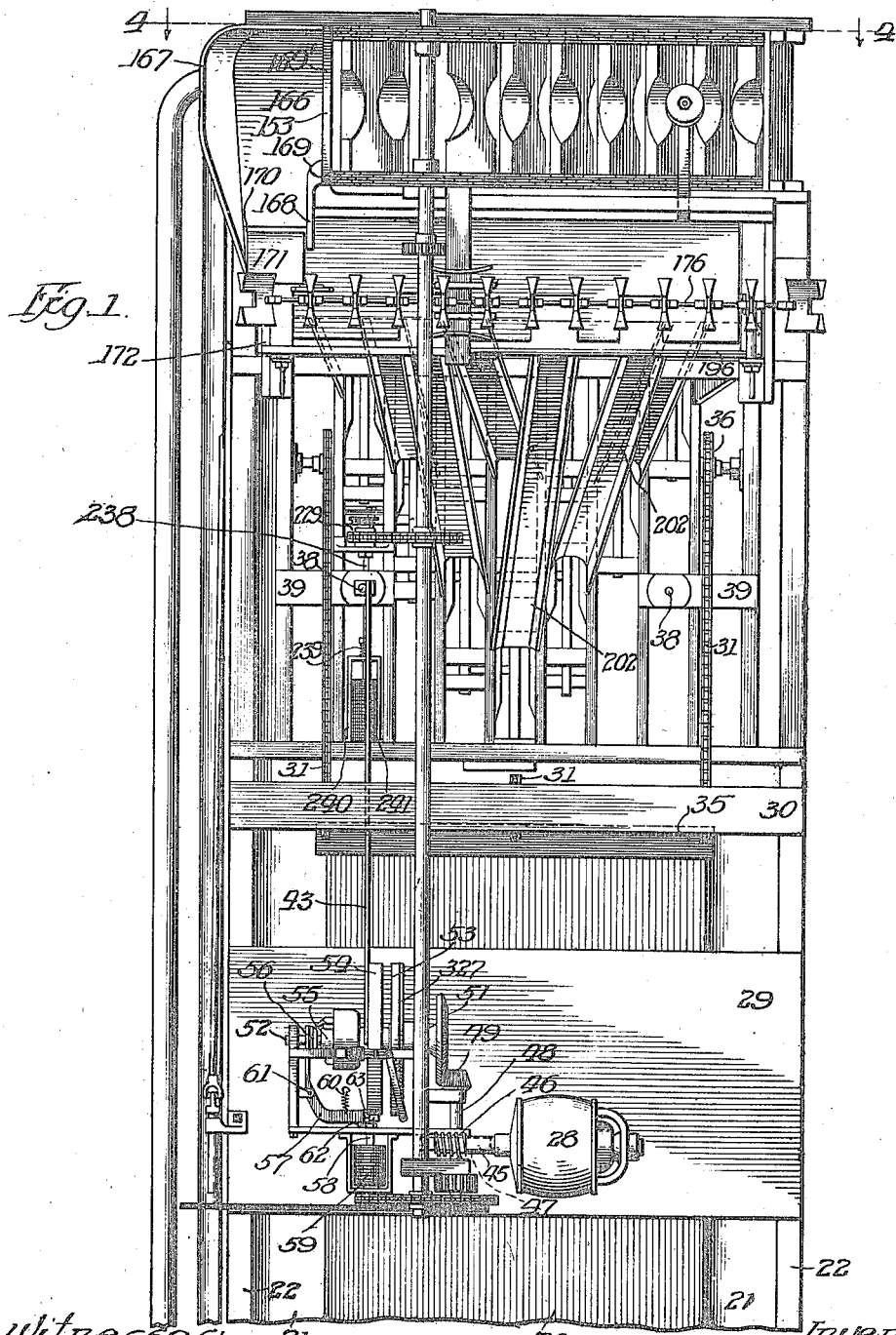

E. HEDENSKOOG.
AUTOMATIC PIN SETTING MACHINE.
APPLICATION FILED SEPT. 6, 1913.

1,190,644.

Patented July 11, 1916.
9 SHEETS—SHEET 1.

Witnesses:

Inventor:
Ernest Hedenskoog
By Leuthisan Belt + Fuller
Attys.

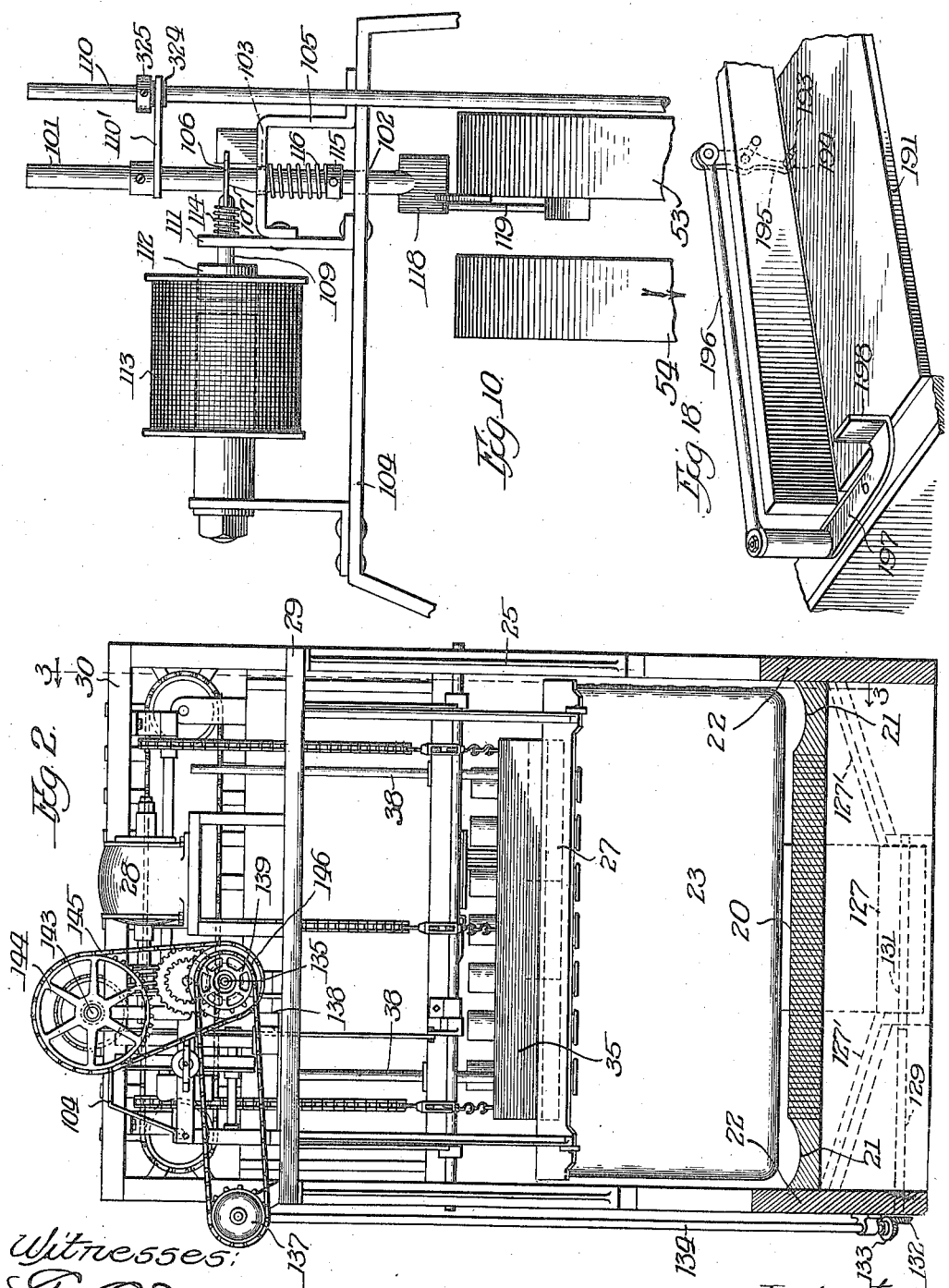

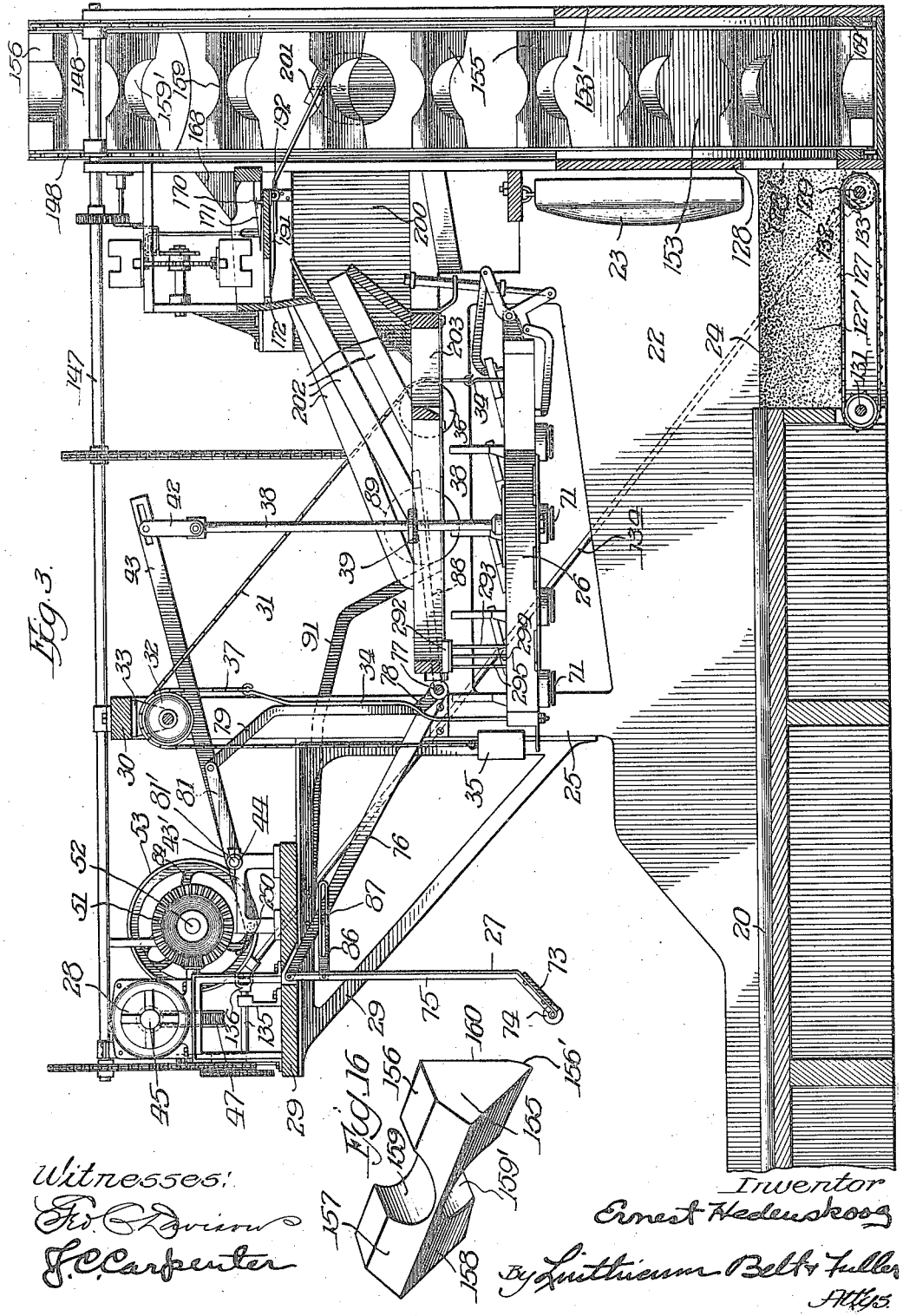

E. HEDENSKOOG.
AUTOMATIC PIN SETTING MACHINE.
APPLICATION FILED SEPT. 6, 1913.
1,190,644.
Patented July 11, 1916.
9 SHEETS—SHEET 4.
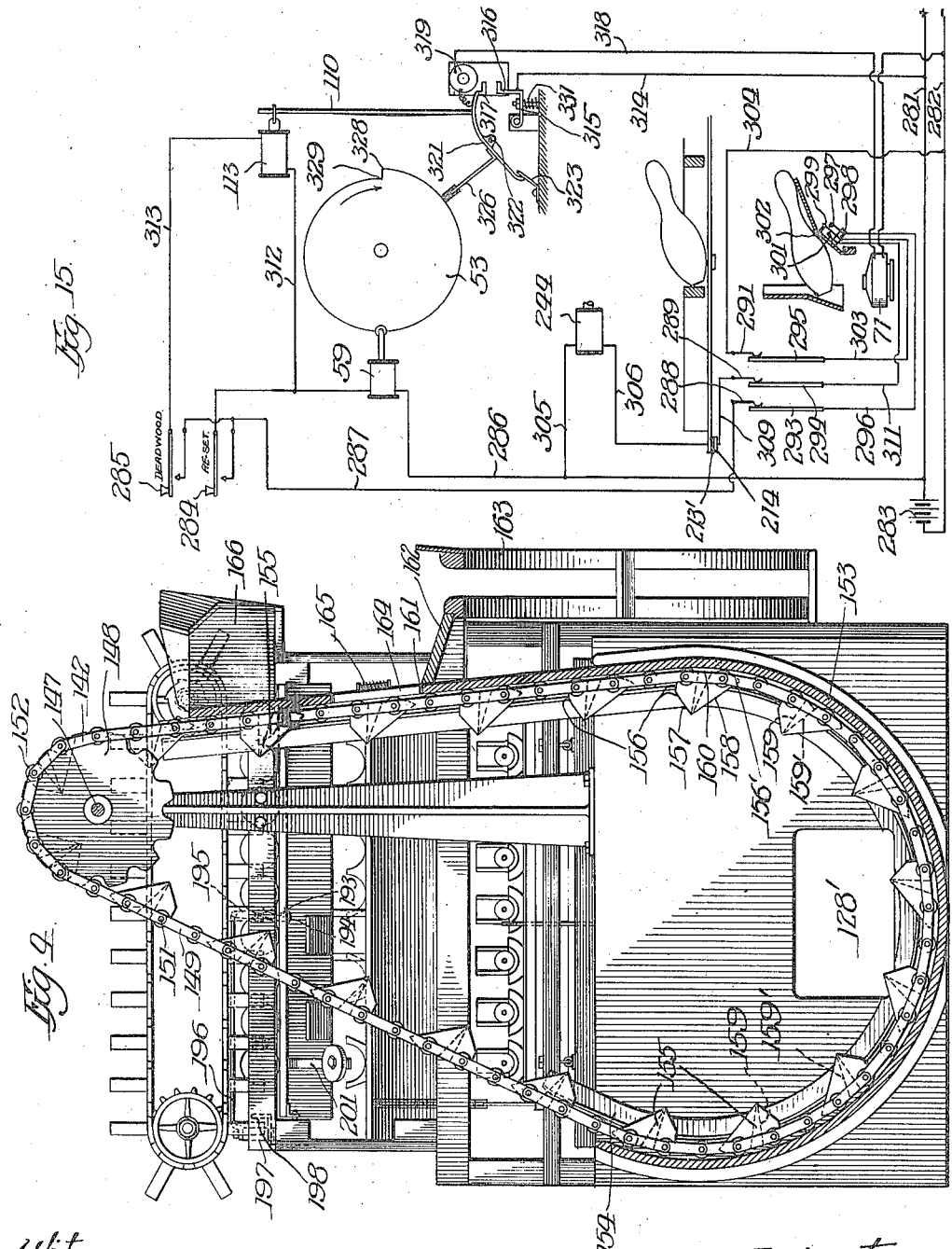

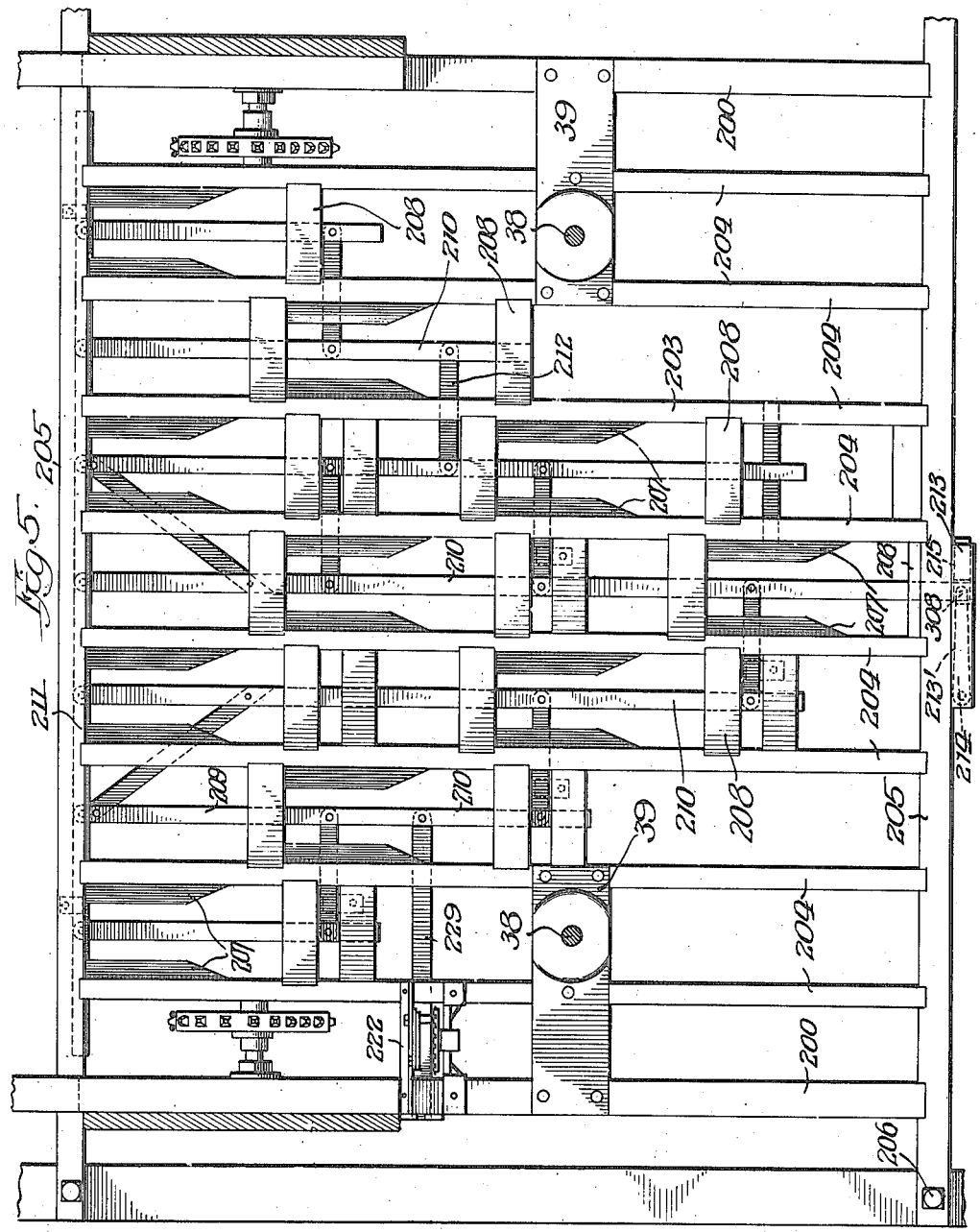

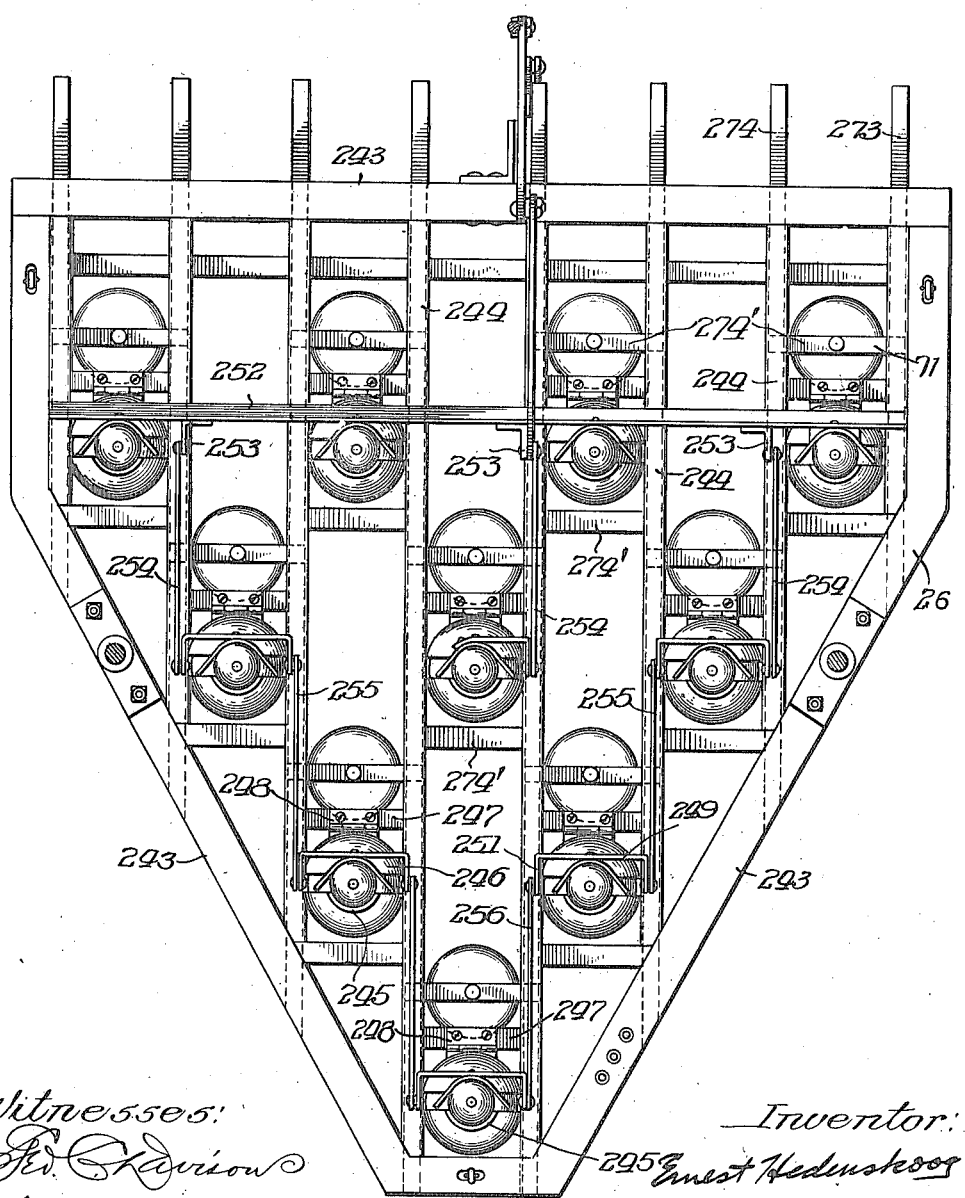

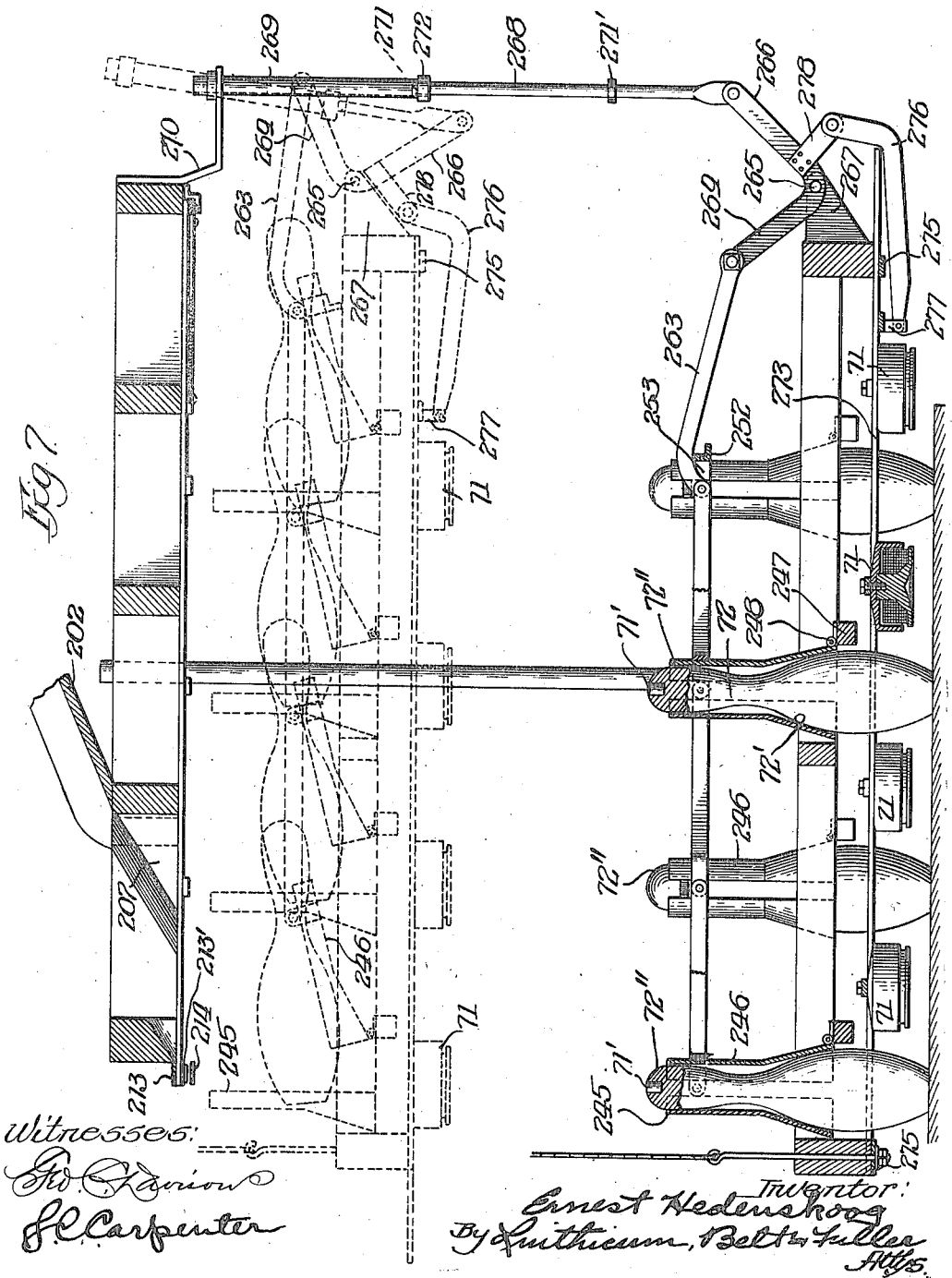

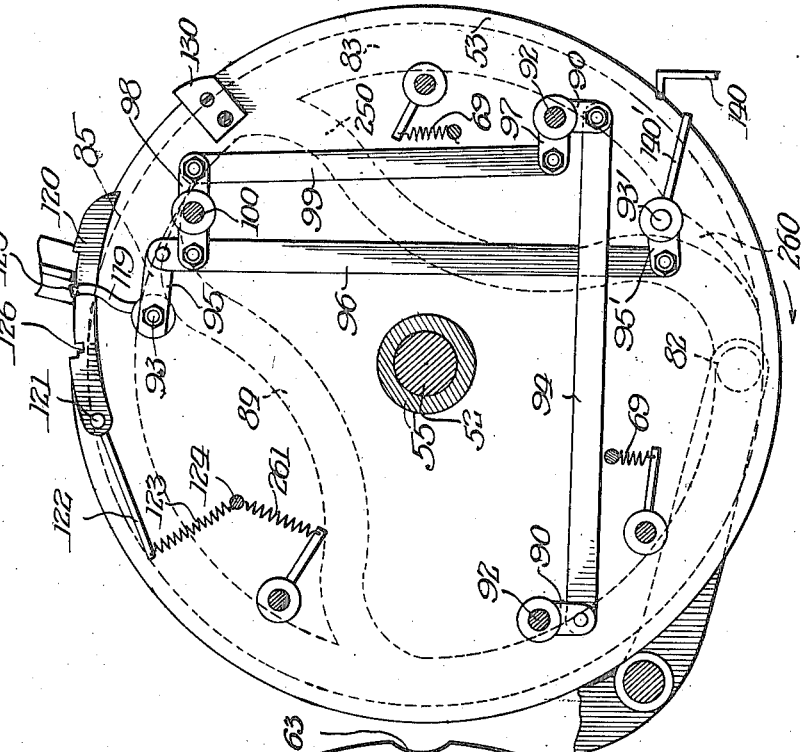

E. HEDENSKOOG.
AUTOMATIC PIN SETTING MACHINE.
APPLICATION FILED SEPT. 6, 1913.
1,190,644.
Patented July 11, 1916.
9 SHEETS—SHEET 9.
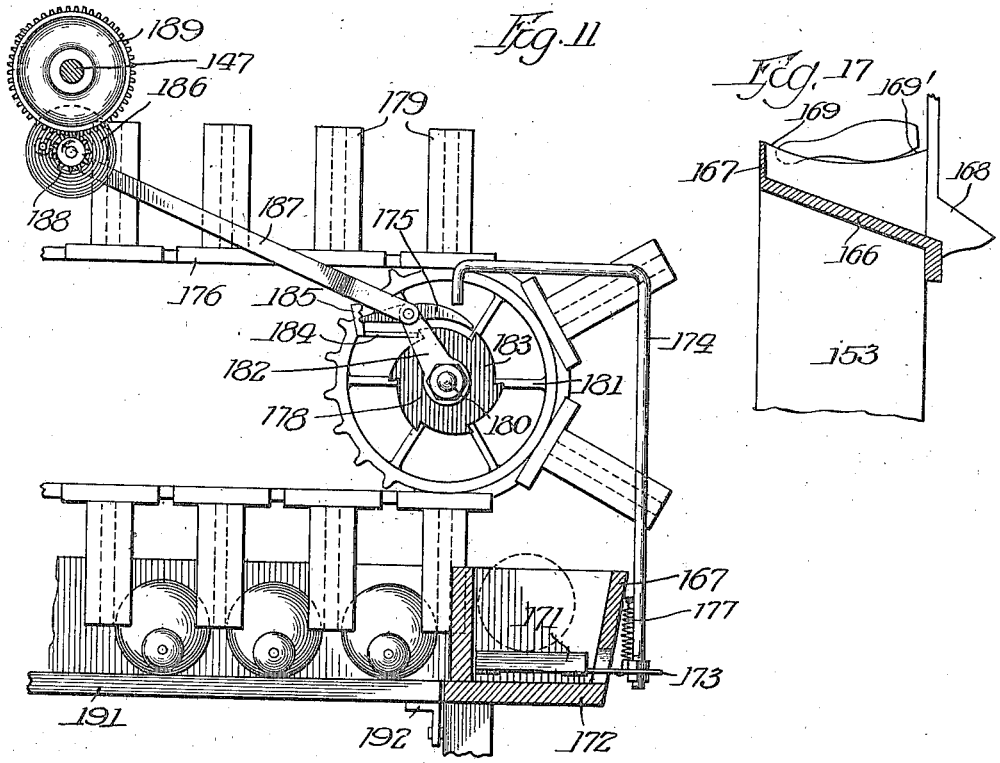
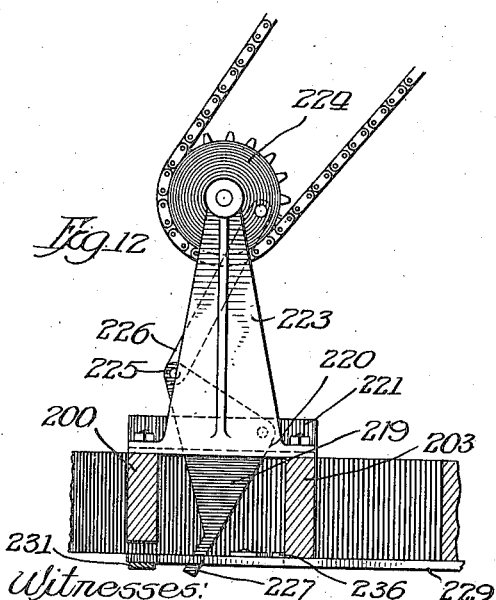
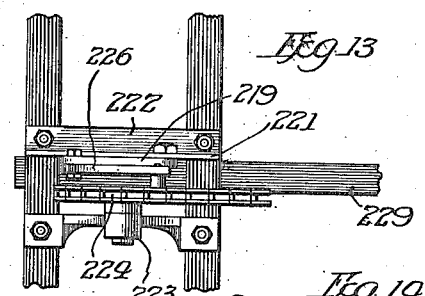
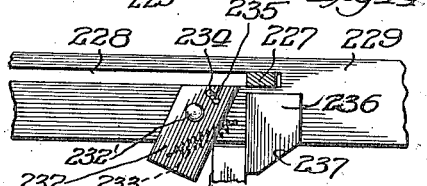

UNITED STATES PATENT OFFICE.

ERNEST HEDENSKOOG, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

AUTOMATIC PIN-SETTING MACHINE.

1,190,644. Specification of Letters Patent. Patented July 11, 1916.

Application filed September 6, 1913. Serial No. 788,410.

*To all whom it may concern:*

Be it known that I, ERNEST HEDENSKOOG, a citizen of the United States, residing at Muskegon, in the county of Muskegon and State of Michigan, have invented certain new and useful Improvements in Automatic Pin-Setting Machines, of which the following is a specification.

This invention has for its object broadly to dispense with the services of a pin boy for setting pins on the alley and returning the balls to the player's position.

In the game of tenpins as generally played, ten pins are arranged in triangular formation at the end of the alley in front of the pit. The player has the right to roll two balls. If the first ball knocks down all the ten pins, the player scores a strike; if he knocks down some of the pins with his first ball and all of the remaining pins with the second ball, he scores a spare; if any pins remain standing after the player rolls both balls, he only scores the number of pins knocked down.

It has been customary in the past to station a pin boy in the pit of each alley to place the balls on the track for return to player's position, to remove the fallen pins called "deadwood" that may remain on the alley or in the gutters alongside the alley, and to set the pins as required. Attempts have been made to expedite the work of the pin boy in various ways and in recent years, pin-setters have come into general use. One form of setter consists of a vertically movable frame, provided with pockets for the pins and into which the pin boy throws or places the pins while the setter is at rest on the alley bed and then operates suitable mechanism to elevate the setter, leaving the pins set in proper position on their spots. Another form of setter comprises a vertically movable frame which is filled with pins while the setter is in elevated position and which is then operated to descend and set the pins on their spots and then rise to its normal elevated position. These machines are employed to a considerable extent at present because they facilitate and expedite the work of the pin boy, and also for accurately setting the pins on the spots.

Some efforts have been made to dispense with the services of the pin boy by attaching cords to the pins which can be operated by the players but it is not permitted in the standard game of tenpins to restrain or restrict the freedom of movement of the pins and such devices have not proven practicable or commercially satisfactory.

This invention has for its object to provide an automatic machine which is wholly under the control of the player and which dispenses with the necessity for a pin boy by doing all of the work heretofore done by the pin boy.

Further objects of the invention are to provide automatic mechanisms and devices for removing deadwood from the alley; for delivering the ball from the pit to the return track; and for delivering the pins from the pit to the setter frame; and for setting the pins in the proper position on the alley bed when the latter is cleared.

A further object of the invention is to provide a pin setting machine which will perform these operations rapidly so that the balls will be returned promptly and the deadwood removed and the pins re-set immediately upon actuation of the controlling devices by the player thereby permitting substantially continuous and uninterrupted play upon the alley without the usual delays incident to the pin setting methods at present in vogue.

Other objects and advantages of the invention will be apparent as it is better understood from the following description considered in connection with the accompanying drawings disclosing a preferred embodiment thereof.

On the drawings—Figure 1 is a top plan view of a pin setting machine embodying my invention showing it in operative position at the pit end of a bowling alley; Fig. 2 is a front elevation of the same; Fig. 3 is a vertical sectional view on the line 3—3 of Fig. 2; Fig. 4 is a vertical sectional view on the line 4—4 of Fig. 1 showing the means for elevating the pins into position to be fed into the distributing frame and for delivering the balls to the return track; Fig. 5 is a top plan view of the distributer; Fig. 6 is a top plan view of the pin setter; Fig. 7 is an enlarged detail vertical sectional view taken through the distributer and pin setter. Fig. 8 is an enlarged front elevation of the cam provided to control the operation of the pin setter. Fig. 9 is an enlarged view of the cam controlling the movement of the sweeper and of the mechanism mounted between it and the cam controlling the movement of the pin setter. Fig. 10 is an enlarged detail view of the magnet and coöperative parts provided to arrange the cams for the removal of deadwood. Fig. 11 is an enlarged detail view showing a part of the pin assembling device. Figs. 12, 13 and 14 are enlarged detail views showing parts of the mechanism provided to cause pins carried by the distributer to be deposited into the pin setter frame. Fig. 15 shows diagrammatically the wiring and connections provided to control the numerous magnets employed in the present embodiment of my improved pin setting machine. Fig. 16 is a detail perspective view of one of the flights; Fig. 17 is a vertical sectional view showing the curved upper edge of casing of the elevating conveyer, and Fig. 18 is a detail view of the mechanism provided to release the assembly shelf when a full set of pins has been assembled thereon.

Referring to the drawings I have shown one preferred embodiment of my invention installed in position at the pit end of a regular bowling alley. The bowling alley (Figs. 1-3) is of the usual form comprising the alley bed 20, the gutters 21 and side walls 22. At the rear of the alley is the usual swinging bumper 23, supported above and at the rear of the pit 24 in position to break the force of the balls and flying pins and cause them to drop into the pit.

The various parts and mechanisms of the pin setting machine are mounted in a suitable frame 25 which is supported upon the side walls 22 of the alley. These parts and mechanisms will be described as nearly as possible in the order in which they are called upon to perform their duties.

Assuming that the pins have been set the first function of the pin setting machine will be to remove the deadwood after the ball has been rolled by a player. This is done by the pin setter frame 26 and sweeper 27, the operation consisting in sweeping back into the pit all deadwood on the alley or in the gutters if all pins have been knocked down, and in lifting the standing pins, if any remain standing, to permit the sweeper to remove the deadwood and then returning the standing pins to the exact position from which they were lifted. Both the sweeper and the pin setter frame, as well as numerous other parts, are actuated from a continuously operating motor 28 mounted upon a platform 29 which is supported at the front of the pin setting machine by the frame 25. The pin setter frame 26 is vertically movable and is supported from the transverse horizontal member 30 of the frame 25 by a plurality of chains 31 trained over pulleys 32, which are journaled in brackets 33 secured beneath the said horizontal member, (Fig. 3). Each of these chains is fastened at one end to the pin setter frame by a hook 34 or other suitable means, and at the other to a counterweight 35. In the present instance, three chains are provided, the central one of which is secured to the front of the pin setter frame and led directly over its pulley 32 while the other two are secured to the rear of the pin setter frame and are trained over intermediate pulleys 36 secured above the pin setter frame.

A pair of guiding rods 38 are rigidly secured to the pin setter frame and extend outwardly therefrom. Each of these rods passes through and is guided by a bearing plate 39 secured above the pin setter frame. The upper end of one of the rods 38 is pivotally connected by a link 42 with a lever 43 which is journaled at its fulcrum 43' in suitable bearings 44 extending above and mounted on the platform 29. The oscillation of this lever about the bearings 44 lifts and lowers the pin setter frame when it is desired to pick up the pins preparatory to removing the deadwood from the alley and when it is desired to return them again to position after this operation has been performed. The shaft 45 upon which the armature of the motor is rigidly fixed, is provided with a worm 46, which continuously operates a gear 47 mounted upon an end of the horizontal shaft 48. This shaft is provided at its other end with a bevel gear 49 which meshes with a bevel gear 51 upon the end of the shaft 52. A pair of cam disks 53 and 54 are loosely mounted on the shaft 52. These disks transmit the power to and furnish the control for the movements both of the sweeper and of the pin setter frame. The cam disks 53 and 54 are normally at rest and are adapted upon desired occasions to be locked to the shaft 52 to rotate therewith. These disks are fixed upon a collar 55 encircling the shaft 52 which coöperates at one end with a friction clutch collar 56 slidable upon the shaft 52. The slidable collar 56 is connected to one end of the lever 57 fulcrumed at 61 and carrying at its other end an armature 58 for a magnet 59. When this magnet is energized the armature is pulled toward the magnet thereby swinging the lever on its fulcrum to move the collar 56 into engagement with collar 55, thus throwing in the clutch. It is desirable, as will be later understood, that the disks make one complete revolution for each operation of the pin setting machine and to this end a roller 62 is provided upon the end of the lever 57 adjacent the armature 58 which normally rests in a depression 63 in the outer cylindrical face of the disk 54. When the lever is moved to throw in the clutch by the magnet the roller is pulled from the depression and as the disks rotate rolls upon the cylindrical surface of the disk 54 positively maintaining the clutch in engagement until the depression is again in position to receive the roller. A spring 60 is connected to the lever 57 and pulls the lever about its fulcrum when the depression 63 arrives at this point. The roller in again entering the recess 63 permits the spring to move the lever about its fulcrum to throw out the clutch and prevents excessive movement of the disks.

Upon the end of the arm of the lever 43, which is adjacent the cam disks 53 and 54, is provided a roller 64 (Fig. 8), normally resting in an annular groove 65 in the cam disk 54 and concentric therewith. In this disk are provided a pair of grooves 66 and 66' each normally closed at its end by fingers 67, 67' and 68. The fingers 67, 67' through a suitable mechanism to be later described, open and close the grooves to direct the roller successively through the grooves 66 and 66' or to maintain it in the groove 65, while the fingers 68 are merely held in closed position by means of springs 69 mounted between the disks. When the roller 64 is diverted into the groove 66, the lever 43 is moved about its fulcrum lowering the rod 38 and pin setter frame 25.

Mounted on the under side of the pin setter frame and directly above the pin spots upon the alley bed are ten lifting magnets 71 (Fig. 7) adapted to engage the tops of the ten pins or as many of them as are left standing after a ball has been rolled down the alley. In the top of each of the pins 72 is provided a small metallic element 71', adapted to be attracted by these magnets so that after the frame has descended to carry the magnets into engagement with the standing pins the magnetic attraction between the magnets and the elements 71' will lift the pins when the frame is moved upwardly as the roller 64 approaches the groove 65 at the end of its passage through the groove 66, all of which is more fully described hereinafter. After the standing pins have been lifted the sweeper 27 (Fig. 3) is moved downwardly until the blade 73 is supported by the rollers 74 in the gutters at the sides of the alley bed, and then the sweeper is moved rearwardly on the rollers to sweep the deadwood into the pit. The mechanism for imparting this movement to the sweeper is as follows: The blade 73 of the sweeper is provided at each end with an upwardly extending bent arm 75 which is pivotally connected at its upper end to the end of an arm 76, rigidly secured to a shaft 77, extending transversely of the pin setting machine and journaled at its ends in the frame 25. A lever 81, fulcrumed at 81' concentrically with the lever 43, is pivotally connected by a link 79 with an arm 78 rigid on the shaft 77. Upon the end of the lever 81, adjacent the cam disks is provided a roller 82 (Fig. 9), which moves in an annular groove 83 in the face of the cam disk 53. A groove 84 in the face of the disk 53 communicates at its end with the groove 83 to carry the roller 82 inwardly toward the center of the cam. A finger 85 at the forward end of the groove 84 is adapted to be operated to divert the roller from the groove 83 into the groove 84, which controls the movement of the sweeper after the pin setting machine has lifted the pins from the alley bed as just described. When the roller 82 passes through the groove 84, the lever 81 is moved about its fulcrum and through the link 79, rod 77, arms 76 and 78 the sweeper is lowered and moved rearwardly over the alley bed to sweep into the pit the pins which have fallen upon the alley and in the gutters. The movement of the sweeper is restrained by means of a slotted link 86 pivoted at one end to the arm 75 and embracing a pin 87 upon the arm 76 at the other end.

A sliding weight 89 (Fig. 3) is carried by an arm 88 mounted rigidly upon the shaft 77 to counterbalance the sweeper 27. The weight is caused to slide upon the arm 88 by a fixed guide 91 on which the weight travels and which serves as a cam to increase and decrease the leverage provided by the weight as may be required at different points in the swing of the arm 88.

The grooves 66, 66' and 84 in the disks (Figs. 8, 9) are normally closed by the fingers 67, 67' 85, and are adapted to be opened when it is desired to remove the deadwood by a mechanism located between and above the disks which will now be described (Figs. 9, 10). The two fingers 67, 67' and the finger 85 are rigidly mounted respectively upon a pair of stub shafts 92 and a stub shaft 93, each of which extends through and is journaled in the disk carrying its finger. Arms 90 are mounted on the stub shafts 92 between the disks and are pivotally connected at their end to a link 94 so that the two fingers 67, 67' must move in unison. A link 96 is connected at one end with an arm 95 mounted on stub shaft 93 and at its other end with an arm 95' mounted on stub shaft 93'. The arms 90 cause both fingers 67, 67' to open or close the grooves 66 and 66' at the same time, and connections between the links 94 and 96 cause the finger 85 to open and close with the fingers 67, 67'. A preferred connection between the two links 94 and 95 consists of an arm 97 rigidly connected to the stub shaft 92 of the finger 67, a lever 98 fulcrumed between the disks upon a stub shaft 100 and having one arm connected to the link 96, and a link 99 connecting the other arm of the lever with the arm 97, so that the longitudinal movement of the link 96 will produce a corresponding longitudinal movement of the link 94.

When it is desired to remove the deadwood the link 96 is moved substantially longitudinally from the normal position shown in Fig. 9 by a mechanism to be now described, and a like movement is imparted to the link 94 through the lever 98, link 99, and arms 97 and 90. A vertically movable rod 101 (Fig. 10) is guided in openings 102 and 103 in a shelf 104 above the cams and in a bracket 105 carried by the shelf. The rod is normally retained at the upper limit of its travel by a detent 106, engaging a notch 107 in the side of the rod. The detent is secured to an end of a rod 109 which is slidably mounted in a vertically disposed bearing plate 111 carried by the shelf. The other end of this rod carries an armature 112 for a magnet 113 and the detent 106 is normally pushed toward the rod 101 by a spring 114 coiled about the rod 109 and acting against the detent 106 and the adjacent face of the bearing plate 111. A coiled spring 116, which constantly pushes the rod 101 downwardly, encircles the rod 101 and engages the lower horizontal face of the bracket 105 and a collar 115 mounted on the rod. A rod 110 is connected to the rod 101 by a bar 110', which, as will be described in connection with the electrical wiring of the pin setting machine, controls in part the movements of a switch in the circuit supplying current to the magnets 71 which lift the pins.

The lower end of the rod 101 is flattened to provide a leaf 118, adapted to engage and move a finger 119, provided upon the stub shaft 93, causing a movement of the mechanism controlling the position of the various fingers (Fig. 9). The finger 119 is bent over a notched plate 120, pivoted at 121 on the inner face of the disk 53. Rearwardly of the pivotal connection between the plate 120 and disk 53, extends an arm 122, to which an end of a spring 123 is fastened. The spring is fastened at its other end to a post 124 and serves to lift the notched end of the plate 120 outwardly from the center of the disk into engagement with the bent over end of the finger 119. Two notches 125 and 126 of appropriate form to be engaged by the finger 119 are provided in the outer edge of the plate 120. The finger normally engages the notch 125 maintaining the fingers 67, 67' and 85 in closed position. When the magnet 113 is energized, the armature is drawn inwardly of the magnet and the detent 106 is disengaged from the notch 107 in the rod, permitting the spring 116 to pull the rod downwardly into position to interpose the leaf at the lower end of the rod in the path of the finger 119 as the disk rotates. This finger is thus moved from the notch 125 into the notch 126, moving the links 96 and 94 from the position shown in Fig. 9, opening the finger 85 of the disk 53 and both fingers 67, 67' of the disk 54. As the disks rotate the fingers 67, 85 and 67' are opened and the roller 64 is guided into groove 66 and finally engages and opens yielding finger 68 and passes into groove 65. During this portion of the revolution of the disks the pin setter frame is lowered until the magnets 71 contact or approximately contact with the tops of the standing pins and is raised carrying the pins, which have been attracted by the magnets, to elevated position. The pins are held in this elevated position throughout that portion of the revolution of the disks while the roller 82 is passing through the groove 84 of the disk 53, during which the sweeper sweeps the alley and returns to inoperative position. After the roller 82 leaves the groove 84, the roller 64 enters the groove 66', lowers the frame to replace the pins in the exact position they occupied before the deadwood was removed. The deënergizing of the magnets 71 at this time will permit the pin setter frame to move again to elevated position leaving the pins on the alley bed. The rod 101 is returned to elevated position by the stop 130 after the magnet 113 has ceased to receive its energizing current and the finger 119 is moved from the notch 126 back into the notch 125 by an arm 140, mounted upon the platform 29 between the disks (Fig. 9). When the fingers are operated for the removal of deadwood, a finger 140' rigidly mounted upon the stub shaft 93' is moved into position to be struck by the arm 140. The engagement of this finger with the arm 140 causes the finger 119 to be reset in the notch 125 by the movement of the arms 95, 95' and connecting link 96 thereby returning the fingers 67, 67' and 85 to normal position as shown in Figs. 8 and 9.

When the pins and balls fall into the alley pit (Fig. 3), they drop either upon a continuously moving centrally disposed carrier 127 or upon either of a pair of inclined walls 127', one of which is located upon each side of the carrier 127 in position to cause the balls and pins falling thereon to roll down upon the carrier. The carrier moves always toward the rear wall 128 of the pit in which is an opening 128' beneath the swinging bumper 23 and through which the carrier delivers the pins and balls. The carrier 127 travels over rollers 129 and 131, the rearmost of which, 129, is provided at an end with a bevel gear 132, meshing with a bevel gear 133, fixed upon the end of an inclined shaft 134, continuously rotated from a shaft 135 through a universal joint 136, connecting it therewith. The shaft 135 is mounted in suitable bearings upon the platform 29 and is continuously rotated from the main power shaft by suitable gearing designated generally as 137. As the pins and balls are delivered by the carrier 127 through the opening 128' they are received by an elevating mechanism located at the rear of the machine which deposits the balls upon the return track and the pins on the assembly shelf. (Figs. 3, 4).

The elevating mechanism comprises a carrier 142 which is continuously driven from the main power shaft 147 by a pair of large sprocket wheels 148 rigidly mounted on the main power shaft. The power shaft receives its power from the motor 28 through the sprocket chain 145 meshing with the sprocket wheels 144 and 146 mounted respectively on the shafts 143 and 135 (Fig. 2). The elevating carrier 142 comprises a pair of chains, each of which is trained over a sprocket wheel 148 and is composed of side bars 149 arranged in pairs and the adjacent pairs are pivotally connected by means of pivot pins 151. Each of the pins 151 forms a shaft for a roller 152, the said roller being formed to fit between the teeth of the sprocket wheels 148. The carrier operates partly in a casing which comprises a curved wall 153, the rear wall of the pit and a back wall 153'. The carrier travels alongside the curved wall and is guided thereby and by a pair of tracks 154, (one for each chain) the rollers moving between the tracks and the inner surface of the wall 153, as is possibly best seen in the lower right hand corner of Fig. 3. Upon a plurality of the pivot pins 151 are mounted the lifting flights 155. Each of these flights is secured at each side to a pair of pivot pins and extends inwardly of the carrier. The flights are all identical in form and a description of one of them (Fig. 16) will apply to the others and I will describe one as it appears upon the upward travel of the carrier. The flight is preferably formed of a solid block of wood and is bounded by a plurality of substantially flat faces. The single outer face 160 or the face which is disposed adjacent and substantially parallel to the inner face of the curved wall 153 of the casing extends to the upper face 156 and the lower face 156'. The upper face is inclined to the outer face 160 at an angle slightly greater than 90 degrees so that pins and balls resting upon the upper face will roll outward toward the outer face 160 and bear gently against the inner surface of the curved wall 153. The lower face 156' is inclined to the face 160 at an angle much greater than 90 degrees and the upper and lower faces 156 and 156' are connected by two inner inclined faces 157 and 158, intersecting above the transverse center of the flight so that the lower inner face 158 is much longer than the upper inner face 157. Each flight is provided with a recess 159 to receive the ball and this recess is preferably arcuate and centrally located between the ends of the flight. When the flights are located comparatively close together, or to better retain the balls in said recesses 159, I may provide recesses 159' of similar form and location in the under side of the flights. Viewing Fig. 4, where the bases of the recesses are indicated by dotted lines, it will be noted that the upper recess 159 extends from substantially the intersection of the two inner faces 157 and 158 to the outer face 160 of the flight and that its base is inclined to the outer face 160 at an angle equal approximately to the angle formed by the faces 160 and 156. The lower recess 159' extends substantially from the intersection of the faces 157 and 158 to the outer face 160 beneath and at a substantial angle to a perpendicular to the outer face 160. The inclination given the upper face 156 of the flight and the inclination given the bottom of the upper recess 159 causes the pins and balls carried by the flights to roll against and be partially supported by the wall 153 of the casing. The amount of support offered by this wall of the casing is, however, reduced to a minimum in order to provide as little friction as possible to the movement of the carrier, and to this end the sprocket wheels 148 are positioned inwardly of the sides of the alley and the wall 153 of the casing is inclined slightly from the vertical to the said sprocket wheels.

As the pins and balls are delivered through the opening 128' in the rear wall of the pit on to the carrier they are tumbled and jostled by the carrier until, one by one, they become lodged upon the flights and are carried up to discharge position as will now be described. The recesses 159 form seats for the balls and retain them in place on the flights, preventing movement endwise of the flights and inwardly of the carrier. The pins may be carried up either end foremost on the flights and as it is necessary in this embodiment of my invention that the pins move onward butt end foremost after delivery from the carrier I provide means for reversing the position of the pin as it is delivered from the carrier if its head end should be foremost.

The wall 153 (Fig. 4) of the casing extends a substantial distance above the opening 128' on the return side of the carrier and on the other side above a shelf upon which the pins are collected. In the latter side of the casing is provided an opening 161, of sufficient size to permit the bowling balls to pass out of the casing and onto an incline 162, leading to the top of the return track 163. The opening 161 is provided with a door 164 normally retained in closed position by a spring hinge 165. The spring of this hinge is of sufficient strength to maintain the door in closed position when a flight 155 carries a pin past the same but is not strong enough to prevent a bowling ball from opening the door and rolling by gravity out and onto the track.

When the pins carried by the flights reach the top of the wall 153 they are deposited into a chute 166 (Figs. 1, 17). This chute is provided at its outer and upper sides with an upwardly inclined curved wall 167. The wall of the chute adjacent the carrier is composed in part of the upper end of the wall 153 and in part of the wall 168. The upper edge of the wall 153 over which the pins roll by gravity when the flights carrying them pass thereby is curved to provide upwardly extending ends 169, 169'.

Each pin lies on the flight with its body and head in contact with the upper face 156, and rolls outward against the wall 153 of the casing in a slightly inclined position lengthwise. If the head end of the pin is foremost when carried up by a flight it will engage the forward projecting end 169 of the upper edge of the wall 153 when the pin rolls off the flight and be retarded while the butt end rolls rapidly about in the chute until the butt end of the pin is foremost in the chute. This movement of the pin is largely due to the shape of the pin, of standard form, which produces a rapid movement when the pin is being reversed in position as it is delivered from the carrier. If the pin is carried up butt end foremost its head end will be retarded but slightly by the projecting end 169' because the body rolls off the flight rapidly and by the time the body is in the chute, butt end foremost, the head slides away from the projection.

From the chute each pin passes to the assembly mechanism (Figs. 1, 3, and 11) which will now be described. At the bottom of the chute each pin passes over a swinging leaf 171 onto a table 172 located in the present instance just beneath the bottom of the chute. The swinging leaf is hinged at 170 on the table across the chute and is provided with an arm 173, extending outwardly through the outer wall 167 of the chute which extends over the table. To the free end of this arm is secured an upwardly extending bent arm 174 which actuates a pawl 175 pivotally mounted on an arm 182 loose on shaft 180 to actuate the mechanism controlling the movement of the assembly conveyer 176. A spring 177 fastened to the arm 173 and to the wall 167 normally maintains the free end of the leaf 171 elevated above the table 172. When, however, a pin slides down the chute and falls onto the swinging leaf 171, the leaf is depressed and the upper end of the arm 174 is moved downwardly thereby to throw the pawl into engagement with a ratchet wheel 178 mounted on the hub of the sprocket wheel 181 thereby moving the assembly conveyer 176 a step. The conveyer 176 comprises a chain upon which are disposed outwardly extending blades 179 at suitable intervals to accommodate a pin between each pair. The chain is trained over a pair of sprocket wheels 181 with which it meshes. Fixed also to the arm 182 is an arm 184 upon the end of which is an upwardly extending post 185, provided with a pair of notches suitably arranged to be engaged by the rear end of the pawl 175, the lower notch maintaining the pawl out of engagement with the ratchet wheel and the upper notch maintaining the pawl in engagement therewith. The arm 184 is flexible to permit the post to yield as the pawl is moved from one notch to the other. When the pawl is actuated by the bent arm 174 its rear end is moved from the lower to the upper notch. The teeth upon the ratchet wheel lift the front end of the pawl when the pawl is retracted and moves the rear end of the pawl from the upper to the lower notch. The end of the arm 182 is connected to a crank disk 186 by means of a link 187. Rigid with the disk is mounted a pinion 188 in mesh with a constantly rotating gear wheel 189 mounted upon the main power shaft 147. It is apparent, therefore, that the arm 182 is oscillated continuously by the crank disk so that the pawl moves back and forth through an arc of given travel either above the ratchet wheel or in engagement with one of its teeth. The travel of the ratchet wheel, which is of course coincident with the travel of the pawl when engaged therewith, is such that the conveyer is advanced one step each time the arm 174 causes the pawl to actuate the ratchet wheel 178. The ratio of the number of teeth of the pinion 188 to the teeth upon the gear 189 must be appropriate to permit an actuation of the ratchet wheel every time a flight 155 passes the entrance to the chute 166 as each flight may carry a pin to be delivered to the assembling mechanism. It will thus be seen that the pin actuates the assembly conveyer and when so actuated a blade of the conveyer engages the pin and moves it forward one step from the table on to the assembly shelf 191. The pins are thus disposed between the blades at the lower travel of the conveyer which moves them along the shelf as the conveyer is advanced. The shelf is carried by suitable brackets 192 pivotally supported on the main frame (Figs. 4, 11). This shelf is normally held in horizontal position and a device is provided, which will now be described, for preventing the tilting of the shelf until a full set of pins has been collected thereon.

At the front edge of the shelf is a pin 193 (Fig. 18) which is engaged by the notched end 194 of a lever 195 pivotally mounted in the main frame above the shelf. To the upper end of this lever is pivotally connected one end of a link 196, the other end of this link being pivotally connected to one end of a lever 197 mounted upon the main frame adjacent that end of the shelf 191 distant from the delivery chute and this lever is provided with an upturned lip 198 at its free end which is disposed over the shelf in the path of travel of the pins and in position to be engaged by the foremost pin of a set when the last pin completing the set is delivered upon the shelf 191. The engagement of this finger by the foremost pin causes the shelf to be tilted and the pins to be deposited into distributing chutes 202 which deliver them to a distributer mounted above the pin setter frame as will be later described. It is obvious that since the tilting of the shelf 191 can be accomplished only by the engagement of the foremost pin at the end of its movement upon the shelf, the full quota of ten pins must be present on the shelf before this tilting action can occur. After the shelf has been tilted and the pins deposited in the distributing chutes, the shelf is returned to its normal horizontal position by means of a counterweight 201 fastened to the shelf. The distributing chutes 202, (Fig. 3) into which the pins fall as they slide from the shelf, are ten in number (one for each pin of the set) and they arrange the pins in the distributer in substantially the relation they have each with the others when they are set upon the spots on the alley bed.

The distributer (Fig. 5) comprises a frame 203 and various other parts to be now described. The frame is formed of a plurality of horizontal parallel longitudinally extending bars 204 disposed between and rigidly connected at their ends to horizontal transverse bars 205, fastened at their ends on the main frame at 206. Preferably eight longitudinal bars are provided evenly spaced apart to form seven channels, each channel being adapted to receive one or two pins in position to be deposited in the pin setter frame. Adjacent each side of the distributing frame and extending parallel with the bars 204 is secured a bar 200 which support the lower end of the chute 166 and the assembly shelf 191. The guiding plates 39 for the rods 38 and the bearings for the pulleys 36 are mounted on the distributing frame. At the end of each distributing chute 202 and within the channels formed by the bars 204 are provided a pair of blocks 207, secured to the inner adjacent faces of the bars and having their upper faces beveled or curved and downwardly inclined from the chutes as will be seen by comparing Figs. 5 and 7. The pins are delivered by the chutes upon these blocks in inclined position, and are prevented from sliding too far toward the front of the frame by stop blocks 208, fastened at their ends to the bars 204. The pins are supported in the distributing frame 203 by means of a lattice-like support 209 slidably mounted beneath the frame 203 and composed of a plurality of metal strips. The longitudinal strips 210 are normally disposed centrally between and parallel to the bars 204, the said strips extending from the rear of the frame to beyond the foremost stop blocks 208 of their respective channels. All of the strips 210 are connected at the rear of the frame to a transversely disposed strip 211 and are connected intermediate their ends with shorter parallel transverse strips 212 to form the lattice-like frame. The central longitudinally disposed strip is extended beyond the front bar 205 of the frame beneath a plate 213 under which is secured a supporting plate 214 suitably insulated from the plate 213. A leaf spring 213' extending transversely of the frame is fastened to plate 213; and the end of the strip 210 slides upon this spring, the force of the spring being sufficient to sustain the end of the lattice-like support 209 above the supporting plate 214 when no pins are in the frame but not sufficient to sustain both the weight of the support and a set of pins carried thereby.

Viewing Fig. 5, the lattice-like support 209 is adapted to be moved toward the left to permit the pins, after being delivered to the distributing frame, to be deposited simultaneously in the pin setter frame. The mechanism for moving the lattice-like support for this purpose comprises a bell crank lever 219 (Figs. 12–14) which is fulcrumed in vertical position at 220 to the side of an upwardly extending flange 221 of an angle iron 222 secured to the distributing frame 203, one end of the said angle iron being fastened upon the bar 204 nearest the left side of the pin setter frame and the other end upon the left bar 200. Adjacent the angle iron 222 an upwardly extending bearing bracket 223 is fastened and supports a sprocket wheel 224, which is eccentrically connected to an arm 225 of the bell crank lever 219 by a link 226 so that the revolution of the sprocket wheel will cause the bell crank to oscillate upon its pivotal connection with the angle iron 222. The other arm of the bell crank lever is made in the form of a finger 227 which slides freely in a slot 228 in a plate 229. This plate is rigidly connected at one end to the lattice-like support 209 and is slidably supported at its other end beneath the member 200 at 231. A locking device 232 is pivoted at 232' upon plate 229 adjacent the slot 228 at one end thereof. This device, when oscillated about its pivot, extends across the slot and consequently across the path of travel of the finger 227. The edge of the locking device adjacent the slot is disposed at an angle to the longitudinal axis of the device so that when this edge is brought in alinement with the adjacent edge of the slot, the axis of the locking device will be inclined to the longitudinal axis of the slot as will be readily seen in Fig. 14. The movement of the locking device is limited by a pin 234 which is rigidly secured to the plate 229 and which extends through an arcuate groove 235 in the device. Adjacent the locking device is provided a stop 236, fastened upon the plate 229. The stop 236 is provided with an inclined face 237 upon its side distant from the locking device and the outer end of the stop 236 is spaced inwardly of the outer end of the locking device 232 when the device is disposed in the path of the finger 222.

A finger 238 preferably having a rectangular end is slidably mounted in a yoke 240 (Fig. 1) fastened to the distributing frame and is normally interposed between the locking device and the stop 236 to maintain the device in inoperative position and thereby permit the finger 227 to reciprocate freely in the slot 228. The finger 238 is pushed toward the plate 229 by a spring 239 and is provided at its end distant from the plate with an armature for a magnet 241 which, when energized, momentarily pulls the armature toward itself and moves the finger 238 away from the plate 229 against the force of the spring 239. This movement of the finger 238 withdraws it from between the locking device 232 and the stop 236 and permits the spring 233 to pull the locking device across the slot 228 into position to lock the finger 227 in the end of the slot adjacent the lattice-like support. If the finger is at this end of the slot when the magnet 241 is energized the locking device engages it and locks it to the plate 229. If, however, the finger is not in this end of the slot when the magnet is energized it engages the inclined edge of the locking device and moves the device about its pivot to permit the finger to pass, the locking device returning immediately to operative position and locking the finger 227 to the plate 229 as before. As the finger oscillates, after being engaged by the locking device, it imparts a reciprocating movement to the lattice-like support, which carries the support first toward the left of the pin setting machine out of normal position leaving the pins in the distributing frame unsupported and then back into normal position again, at which time the locking device is automatically disengaged from the finger 227 and this finger 227 is again permitted to oscillate freely in the slot 228. As the support nears the end of its return movement the finger 238 rides over the inclined face 237 of the stop 236, engages the portion of the locking device extending beyond the said inclined face and causes the said device to be moved to inoperative position where it is held as before by the finger 238 until the magnet 241 is again energized.

When the lattice-like support is moved to the left, viewing Fig. 5, from beneath the pins, they slide from the distributing frame into a pin setter comprising the pin setter frame 26, a plan view of which is shown in Fig. 6. The pin setter frame is composed of relatively heavy outside bars 243 and longitudinally extending bars 244, the latter bars being equal in number to the number of longitudinal bars 204 of the distributing frame. The bars 244 are secured at their ends to the outside bars of the frame and are arranged to dispose them parallel to and directly beneath the bars 204 of the distributing frame, thus dividing the space within the outside bars into seven spaces beneath and corresponding to the seven channels provided in the distributing frame. As the pins leave the distributing frame they are delivered to the pin setter frame immediately above the spots on the alley bed upon which the pins are subsequently to be deposited. The pin setter frame is mounted slightly in advance of the distributing frame as shown in Fig. 3, so that the pins may slide easily from the one frame to the other. Ten upwardly extending transversely curved guides 245 are provided on the top of the pairs of bars 244 in position to form a stop to limit the forward movement of the pins as they slide into the pin setter frame and to aid in guiding the pins into position upon the alley bed, as will be later described. Rearward of each upwardly extending guide is provided a pivotally mounted curved guide 246 on which the pins fall. These guides 246 are fastened beneath the bars 244, upon cross pieces 247 by hinges 248. As the pins leave the blocks 207 of the distributing frame they strike with their butt ends against the guides 245 and then fall upon the guides 246 which support them in the position shown in dotted lines in Fig. 7. The fixed upright guides 245 and the pivoted guides 246 are preferably shaped in a suitable manner so that each pair will engage a pin sufficiently and above its lower portion to properly center and position the pin upon its spot on the alley bed. To this end I prefer to curve the guides transversely and extend them lengthwise sufficiently to engage the pins 72 at the shoulder 72' and also at the sides of the head 72" so that the pins will be centered for proper spotting by engagement of the guides with the upper part of the pin, the lower part being entirely free.

In order that the pins may be delivered to the alley in upright position, the following mechanism is provided. A yoke 249 (Fig. 6) is fastened at its center to the under or rear side of each of the guides 246 which receive the pins to be set up in the three front rows, the arms 251 of the yoke extending toward the front of the guide, and an angle iron 252 is secured to the under or rear sides of all four of the guides 246 which receive the pins to be set up in the fourth or rearmost row. Three forwardly extending brackets 253 are fastened to this angle iron between the last mentioned guides. Each of these three brackets is connected by a suitable link 254 with one of the arms 251 of a yoke 249, secured to a guide which receives a pin to be set in the third row, the two outside brackets being preferably connected to the outside arms of the corresponding yokes. Links 255 are pivoted to the inner arms 251 of the yokes secured to the outermost guides of this row and to the outer arms of the yokes secured to the guides which receive the pins to be deposited in the second row. The inner arms of these yokes are similarly connected by links 256 to the arms 251 of the yoke secured to the guide for the single front pin. It is apparent, therefore, that if the angle iron 252 is moved to raise the rearmost row of guides, the guides of the first three rows will be raised also through the links 254, 255 and 256. The pins are retained in reclining position shown in dotted lines in Fig. 7 until the pin setter frame is moved downwardly to adjacent the alley when the guides 246 are automatically elevated by movement imparted to the angle iron 252 as will be later described and the pins permitted to pass from between the guides 245 and 246 into set position on the spots on the alley bed.

When it is desired to reset the pins, the frame is lowered in a manner similar to that described in connection with the removal of deadwood except that the frame is moved to the position shown in full lines in Fig. 7 which is closer to the alley than is permitted when the frame is lowered to pick up the standing pins preparatory to the action of the sweeper in removing deadwood. This movement of the frame is accomplished by the cam 54 (Fig. 8), the roller 64 being diverted into a groove 257 provided in the face of the cam for the purpose. At the ends of the groove 257 are located the fingers 258 and 259 similar in construction and operation to the fingers 67, and 68 of the groove 66. The finger 258 is the finger which is positively opened and closed to divert the roller 64 into the groove 257 or to prevent its entrance therein, while the finger 259 is merely controlled by the spring 261 similar to the spring 69 and similarly connected to the finger. Finger 258 is mounted on the stub shaft 100 which forms the pivotal axis for and is rigidly connected to the lever 99 constituting an element in the connection between the links 94 and 96 as has been previously described.

As a necessary preliminary step to resetting the pins, the alley bed and gutters must be cleared of pins, and to this end the sweeper is moved along the alley in the manner already described before the roller 64 enters the groove 257 to operate the pin setting machine for setting the pins upon the alley. A groove 250 (Fig. 9) is provided in the disk 53 to impart this movement to the sweeper and is similar in all respects to the groove 84 which actuates the sweeper during the removal of deadwood. It is, however, so located that the sweeping operation is completed and the sweeper returned to normal position before the cam disks rotate through a sufficient angle to bring the roller 64 into the groove 257 of the pin setter frame cam 54. A finger 260 is provided at the forward end of the groove 250 adapted to close the groove during the removal of deadwood and to direct the roller 82 therein when the disks are revolved to re-set the pins. This finger is rigidly mounted upon the shaft 93' which is connected by the arm 95' with the link 96 as heretofore described. The finger 258 of the cam 54 and the finger 260 of the cam disk 53 which open and close the grooves actuating the sweeper and the pin setter frame to re-set the pins are normally maintained to open position. When the magnet 59 which controls the clutch 55 is thrown into operation, the cam disks will, as has been described, make a single revolution causing the roller 82 to be directed into the cam groove 250 of the sweeper disk to actuate the sweeper, and subsequently cause the roller 64 to be directed into the groove 257 of the cam 54 to move the pin setter frame from upper position to adjacent the alley bed and back to upper position again. Attention is called to the fact that in the present embodiment the two grooves 84 and 250 of the disk 53 are identical in form, causing the action of the sweeper to be the same in both operations of the machine, and it will be noted that the groove 257 approaches nearer the center of the cam 54 than do either of the grooves 66 or 66' imparting, as a result thereof, the longer travel to the pin setter frame which is desired in setting the pins. As the pin setter frame nears the bottom of this travel, the guides 246 are swung on their pivots to deposit the pins on the spots by the following mechanism (Fig. 7). A link 263 is bent to extend over the angle iron 252 and is pivotally secured at one end to the central bracket 253 and at its other end to one arm 264 of a bell crank lever 265 which is fulcrumed in a bracket 267 mounted upon the rear of the pin setter frame. The other arm 266 of the lever 255 is pivotally secured to a rod 268 which is telescopically connected within a pipe 269 loosely carried in a bracket 270 fastened to the rear of the distributing frame. Upon the rod 268 are two stops, one 271 being located within the pipe and the other 271' without of the pipe. The movement of the pin setter frame from the position shown in dotted lines to the position shown in full lines in Fig. 7 causes the stop 271 in the pipe to engage a suitable stop 272 at the lower end of the pipe, oscillating the lever 265 about its fulcrum in the bracket 267. This oscillation of the lever 265 acting through the link 263 will move the guides 246 upwardly about their pivotal axes into vertical position. It will be noted that when the stop 272 upon the rod 268 is properly located, this action will occur substantially at the lowermost point in the travel of the pin setter frame, causing the pins to be gently deposited upon the alley. When the frame is returned to upper position, the engagement of the stop 271' upon the rod 268 with the end of the pipe 269 will oscillate the lever 265 in the opposite direction, returning thereby the guides 246 into position to receive a new set of pins.

As the magnets 71 must be disposed above the pins standing upon the alley during the operation of removing the deadwood, I find it convenient to retain them normally in this position. They must be moved out of the way, therefore, when the pins are to be deposited upon the alley as has just been described. To this end the magnets 71 are carried by and depend from a frame 273 (Figs. 6, 7) which is mounted beneath the pin setter frame. This magnet frame is rigid and is composed of a plurality of longitudinal bars 274 and shorter transverse bars 274'. The frame 273 is slidably supported in suitable brackets 275 fastened to the pin setter frame 25 and is automatically moved rearwardly when it is desired to deposit a new set of pins upon the alley from the pin setter frame by a bent link 276 which is pivotally connected at one end to a bracket 277 fastened rigidly beneath and to the said magnet frame 272 and at the other end to an arm 278 riveted or fastened in suitable manner to the arm 266 of the lever 265. The movement of the lever 265 from the position shown in dotted lines to the position shown in full lines in Fig. 7 will cause the frame 272 and the magnets carried thereby to move to the right, viewing Fig. 7, out of the way of the pins. When the lever is returned to the position shown in dotted lines, the magnets are moved automatically back to normal position above the pins to lift the standing pins when it is desired to remove the deadwood.

In Fig. 15 I have shown a system of wiring for the various magnets heretofore described, it being understood, however, that this wiring may be varied in numerous ways without departing from the spirit or scope of the invention or sacrificing any of its advantages. In this diagram 281 and 282 indicate respectively positive and negative main line wires from which power is delivered to the various circuits from a suitable source 283. The various magnets are given the numbers applied to them in the foregoing description of the pin setting machine. Two switch buttons 284 and 285 form the control and are preferably located at the player's end of the alley, the operation of the former causing the re-set of the pins and the operation of the latter the removal of the deadwood. From the line wire 281, a wire 286 leads to one terminal of the switch button 284 through the magnet 59. From the other terminal of this switch button a wire 287 leads to a spring contact finger 288 on the distributing frame. This finger and two similar fingers 289 and 291 are mounted in an insulated member 292 (Fig. 3) and three metal posts 293, 294 and 295 carried by the pin setter frame are adapted to contact therewith upon movement of the pin setter frame, the fingers and posts contacting only when the frame is in upper or normal position. When the spring finger 288 and the metallic post 293 are in contact, connection is made with a wire 296 which is connected to a finger 297, carried beneath one of the movable guides 246. The finger 297 is mounted in a non-conducting block 298, fastened to the underside of the guide and in this block is also mounted a flexible leaf switch 299 adapted to contact either with the finger 297 or with a similar finger 301 carried by the block. The switch 299 is normally in contact with the finger 301 and is adapted to be bent to contact with the finger 297, when pins are resting in the pin setter frame, by a movable stud 302 which extends through the guide and which is pressed by a pin resting therein against the switch 299, causing it to move out of contact with the finger 301 into contact with finger 297. When the leaf switch is in contact with the finger 297, connection is established between the wire 296 and a wire 303 which leads to the post 295. From the spring pressed finger 291 which contacts with the post 295 when the pin setter frame is in upper position, the circuit is completed through a line 304 leading to the negative main line wire 282. Therefore, when the re-set button is pressed the current passing from the main line wire 281 through the magnet 59 energizes this magnet and throws the clutch into operative relation causing the disks to rotate through one revolution whereby the roller 82 is guided through the groove 250, operating the sweeper to sweep the standing and dead pins from the alley, and the roller 64 is then directed through the groove 267 to re-set the pins. When the frame returns to upper position and the rods 293, 294 and 295 contact with the fingers 288, 289 and 291, a separate circuit is established which automatically delivers the pins from the distributing frame into the pin setter frame by energizing the magnet 244. This circuit comprises the wire 286 leading from the main line wire 281, a wire 305 leading from the wire 286 to the magnet 244 which controls the shifting of the lattice-like support holding the pins in the distributing frame in readiness to be received by the pin setter frame, the wire 306 leading from this magnet to the spring 213', upon which the forwardly extending end of the central bar of the lattice-like support is slidably supported and which is adapted to be depressed by the weight of the pins carried in the distributing frame into contact with the metallic plate 214, a wire 309 leading from the metallic plate 214 to the spring finger 289, a wire 311 leading from the post 294 which contacts with the spring finger 289 to the finger 301, which when no pins are carried by the pin setter frame is in contact with the leaf 299, the wire 303 leading from the leaf switch 299 to the post 295 contacting with the spring finger 291, and the wire 304 connecting the spring finger 291 with the negative main line wire 282. It will be apparent, therefore, when the pin setter frame is returned to upper position after depositing the pins upon the alley so that no pin is resting upon stud 302 to depress the leaf switch 299 to break its contact with the finger 301 that, if there are pins in the distributing frame, the circuit just described will be completed to deposit a new set of pins in the pin setter frame. It will be apparent also that the pin setter frame can not be lowered to re-set the pins except when it contains a charge of pins and that the lattice-like support beneath the distributing frame can not be moved except when the distributing frame contains a charge of pins.

When it is desired to remove the deadwood, the deadwood button is pressed and the current passes through the following circuit; up the line 286 to the magnet 59, from the magnet 59 through a wire 312 to the magnet 113 and from the magnet 113 through a wire 313 to one terminal of the deadwood switch, from the other terminal down the wire 287, through the finger 288, rod 293, wire 296, finger 297, leaf switch 299, wire 303, rod 295, finger 291 and wire 304 to the negative main line wire. In this circuit the two magnets 59 and 113 are connected in series with the main line wires so that both magnets will be energized, the magnet 59 to operate the clutch and the magnet 113 to shift the fingers 258 and 85' which control the movement of the sweeper and the pin setter frame for re-setting and which are normally retained in open position, to closed position, and to move to open position the fingers 67, 67' and 85 which control the parts during the deadwood operation.

The magnets 71 which lift the standing pins during the removal of deadwood are energized by a separate circuit. The wire 314 leads from the positive main line wire 281 to one terminal 316 of the switch 315. From the other terminal 317, a wire 318 leads through the magnets 71 to the negative main line wire 282. A suitable blowout or fuse 319 may be interposed in the circuit if desired. The terminal 317 is formed upon one arm of a lever 321 which is mounted to move in a vertical plane and which is constantly pushed about its fulcrum 322 by a spring 323 to bring the terminal 317 into contact with the terminal 316. The lever 321 is rigidly connected to the rod 110 which has been mentioned in describing the mechanism provided for arranging the fingers upon the cams for the removal of deadwood. The rod 110 is normally and positively held in elevated position by the bar 110' upon the rod 101 (Fig. 10) thus maintaining the switch in open position. The rod 110 passes through an aperture in the end of the bar 110' and is insulated from the said bar by a non-conducting bushing 324. A collar 325 fastened upon the rod 110 engages the upper face of the bushing 324 and supports the rod in upper position so long as the detent 106 maintains the rod 101 in inoperative position. The lever 321 and the rod 110 are further prevented from being moved to establish contact between the terminals 316 and 317 by an arm 326 rigidly fastened to the lever at one end and having its other end taking into a groove 327 on the cylindrical face of the cam 53 (Fig. 1). This groove is given a varying depth and the end of the arm 326 located in the groove maintains the lever 321 in the position shown in the diagram (Fig. 15) until the high point 328 of the groove moves under the end of the arm. The rod 110 and its support prevent the closing of the switch 315 at all times except during the removal of deadwood. When, however, the deadwood button is pressed the magnet 113 is energized and the rod 101 permitted to move downward to arrange the fingers upon the disks 53 and 54 for the removal of deadwood, leaving the rod 110 unsupported. When the rod 110 is unsupported it ceases to become an active agency for maintaining the switch 315 in open position. However, the switch 315 can not close until the cams have revolved through a sufficient arc to bring the point 328 under the arm 326 at which time the pin setter frame is disposed just above the tops of the standing pins which the magnets 71 are to lift temporarily from the alley bed. At this point the spring 323 causes the lever 321 to move about its fulcrum 322, to close the switch 315, the end of the arm 326 being pushed by the spring to the low point 329 of the groove. The groove gradually decreases in depth from the point 329 to the point 328 and when the lever 321 is moved to bring the terminals 316 and 317 into contact, the spring 323 moves the lever about its fulcrum until both terminals have been depressed an appreciable distance. The terminal 316 is held in elevated position when the terminals are not in contact by a spring 331 against which the force of the spring 323 moves the lever to depress the contacting terminals. As the end of the arm 326 is moved gradually outward from the center of the cam 153 by the bottom of the groove, the terminals remain in contact until the spring 331 ceases to lift the terminal 316 as the terminal 317 is moved upwardly by the movement of the lever 321. At this point the pin setter frame is again in its lower deadwood position, the sweeper has moved along the alley bed to remove the fallen pins and the magnets 71 are ready to deposit the standing pins which were lifted before the action of the sweeper into the exact positions from which they were moved.

It is apparent that the magnets 71 will replace the standing pins in the position they occupied before being lifted from the alley bed and this is important. It frequently happens that some of the pins are shifted in position but not knocked down when the first ball is rolled. Under the rules of the game, the player must roll his second ball against the pins as they stand and his chances may depend largely upon the position of the pins. Hence it is essential that the pin setting machine in removing the deadwood should not change the position of the pins left standing.

When the pins are set upon the alley and the player rolls a ball along the alley bed he may knock down a few pins or may make a strike. If he knocks down a few pins he presses the deadwood button and the fallen pins are removed in the manner already described. If, however, he makes a strike he presses the re-set button and the sweeper immediately removes all of the pins from the alley bed and the pin setter frame deposits a new set of pins in position for the next player. After his second ball the player will always press the re-set button, whether pins remain standing or not.

Heretofore, after each ball has been rolled by a player much time has been consumed by the pin boy in gathering up the pins and placing them in a frame or upon the spots on the alley bed. A pin setting machine embodying my invention avoids this delay as it will be apparent that the deadwood and re-set operations may be made without any appreciable interruption to the play upon the alley. Although the machine may be operated with a single set of pins, it is believed at present that its most rapid and efficient operation is accomplished when twenty-nine pins are used. This number of pins permits ten to rest in the pin setter frame, ten in the distributing frame and nine upon the swinging shelf of the assembly mechanism. Pressing either of the buttons when this number of pins is used is accompanied by an immediate performance of the operation controlled by the button. The deadwood may be removed or a re-set made in less time than it ordinarily takes a player to remove the ball from the return track.

The circuit controlling the movement of the lattice-like support beneath the distributing frame is normally open as has been described and can not be closed until after the pin setter frame has deposited the new set of pins upon the alley bed and ascended again to normal position. If the pins are resting in the pin setter frame the circuit is broken between the finger 301 and the switch 299. When the frame is out of normal position the circuit is broken between the posts 294, 295 and the contact fingers 289, 291. The lattice-like support is also prevented from being moved when the distributing frame is empty as unless the set of pins are supported upon the lattice-work, the circuit will be interrupted between the spring leaf 213' and the strap 214. This arrangement, together with the trip mechanism upon the shelf, prevents the pins from being advanced from one mechanism to another until the mechanism receiving the pins is empty and ready for their reception.

When the pin setter frame has deposited a set of pins upon the alley and has returned to normal position, the set of pins carried by the distributing frame is immediately and automatically deposited therein. As soon as a ball or the sweeper causes a pin to drop into the alley pit, it is carried through the various mechanisms and devices described to the assembly shelf, completing the set thereon, and causing the foremost pin of the set to drop the shelf and deposit the pins in the distributing frame in readiness to be received by the pin setter frame. The other nine pins of the first set are carried after being removed from the alley bed, as has been described, one by one to the assembly shelf where they await the addition of the first pin of the next succeeding set to permit them to be deposited in the distributing frame. Thus a set of pins is always waiting in the pin setter frame to be deposited upon the alley bed as soon as the re-set button is pressed.

It is apparent that various changes may be made in the form, construction and arrangement of the parts described herein without departing from the spirit and scope of the invention or sacrificing any of its material advantages, the form hereinbefore disclosed, being merely one preferred embodiment thereof.

I claim:

1. In a pin setting machine for a bowling alley, the combination of a vertically movable pin setter comprising a frame and a plurality of pairs of complementary elements secured thereto adapted to receive and guide the pins to their proper position upon the alley bed, automatic means for lowering said setter to pin-depositing position, and means for actuating said setter to deposit the pins.

2. In a pin setting machine for a bowling alley, the combination of a pin setter comprising a frame and a plurality of pairs of complementary elements secured thereto adapted to receive and guide the pins to their proper positions upon the alley bed, automatic means for taking the pins from the alley pit and delivering them to said setter, and means for actuating said setter to deposit the pins.

3. In a pin setting machine for a bowling alley, the combination of a pin setter comprising a frame and complementary elements secured thereto adapted to receive and guide the pins to their proper positions upon the alley bed, a distributer adapted to receive and temporarily retain a set of pins, and means for releasing the pins from said distributer to allow the pins to fall onto said setter.

4. In a pin setting machine for a bowling alley, the combination of a pin setter comprising a frame and complementary elements secured thereto adapted to receive and guide the pins to their proper positions upon the alley bed, a distributer adapted to receive and temporarily retain a set of pins, and automatic means for taking the pins from the alley pit and delivering them to said distributer.

5. In a pin setting machine for a bowling alley, the combination of a pin setter, a distributer above said setter adapted to receive and temporarily retain a set of pins, and means for releasing the pins from said distributer, whereby the pins are allowed to fall onto said setter.

6. In a pin setting machine for a bowling alley, the combination of a pin setter, a distributer above said setter adapted to receive and temporarily retain a set of pins distributed in accordance with their arrangement upon the alley bed, means for releasing the pins from said distributer to allow the pins to fall onto said setter, and means for operating the setter to set the pins in proper position upon the alley bed.

7. In a pin setting machine for a bowling alley, the combination of a pin setter, a distributer above said setter adapted to receive and temporarily retain a set of pins distributed in accordance with their arrangement upon the alley bed, means for assembling a set of pins in parallel relation, means for releasing a set of pins from said assembling means, and means for conveying the pins to said distributer.

8. In a pin setting machine for a bowling alley, the combination of a pin setter, automatic means for delivering at each actuation thereof, a single set of pins to said setter, and means for causing the setter to deposit the pins in playing position upon the alley bed.

9. In a pin setting machine for a bowling alley, the combination of a pin setter adapted to contain only a single set of pins, automatic means for taking the pins from the alley pit and delivering them in sets to said setter, and means for operating the setter to deposit the pins in playing position upon the alley bed.

10. In a pin setting machine for a bowling alley, the combination of a pin setter normally sustained in elevated position above the pin end of the alley bed, automatic means for taking the pins from the alley pit and delivering them in sets to said setter, said means including a distributer for distributing and temporarily retaining a set of pins distributed in accordance with their arrangement upon the alley bed, and means for operating the setter to set the pins in proper position on the alley bed.

11. In a pin setting machine for a bowling alley, the combination of a pin setter normally sustained in elevated position above the pin end of the alley bed, automatic means for taking the pins from the alley pit and delivering them onto said setter, said means including a distributer for distributing the pins in accordance with their arrangement upon the alley bed, and means for assembling and temporarily retaining a set of pins in proper position for delivery to said distributer.

12. In a pin setting machine for a bowling alley, the combination of a pin setter adapted to contain only a single set of pins, automatic means for taking the pins from the alley pit and delivering them in sets to said setter, said means including a carrier for elevating the pins from the pit, and means for operating the setter to set the pins in playing position upon the alley bed.

13. In a pin setting machine for a bowling alley, the combination of a pin setter normally sustained in elevated position above the pin end of the alley bed, automatic means for taking the pins from the alley pit and delivering them onto said setter, said means including a carrier for elevating the pins from the pit and a movable conveyer for delivering the pins in the pit to the carrier, and means for operating the setter to set the pins in proper position on the alley bed.

14. In a pin setting machine for a bowling alley, the combination of a pin setter normally sustained in elevated position above the pin end of the alley bed, automatic means for taking the pins from alley pit and delivering them onto said setter, said means comprising a distributer for distributing the pins in the setter in accordance with their arrangement upon the alley bed, an assembler for assembling and temporarily retaining a set of pins in position for delivery into the distributer, a carrier for elevating the pins from the pit to the assembler, and means for operating the setter to set the pins in playing position upon the alley bed.

15. In a pin setting machine for a bowling alley, the combination of a pin setter normally sustained in elevated position above the pin end of the alley bed, automatic means for taking the pins from the alley pit and delivering them onto said setter, said means comprising a distributer for distributing the pins in the setter in accordance with their arrangement upon the alley bed, an assembler for assembling the pins in position for delivery into the distributer, a carrier for elevating the pins from the pit to the assembler, a conveyer for delivering the pins from the pit to the carrier, and means for operating the setter to set the pins in proper position on the alley bed.

16. In a pin setting machine for a bowling alley, the combination of a pin setter, means for operating the same, and means normally suspended above the plane of the tops of the pins upon the alley bed for sweeping the alley bed to remove pins therefrom.

17. In a pin setting machine for a bowling alley, the combination of a pin setter, a distributer adapted to receive and temporarily retain a set of pins, means for operating said setter, and means for sweeping the alley bed to remove pins therefrom.

18. In a pin setting machine for a bowling alley, the combination of a sweeper comprising means normally suspended above the alley bed and movable toward and longitudinally of said bed, and means for actuating said sweeper to remove pins from said bed.

19. In a pin setting machine for a bowling alley, the combination of a sweeper comprising means normally suspended above and transversely of the alley bed and movable toward and longitudinally of said bed, and means for actuating said sweeper to remove pins from said alley bed.

20. In a pin setting machine for a bowling alley, the combination of a pin setter, a single means for removing both the pins and the bowling balls from the pit, means adapted to receive the balls from said removing means and to deliver them upon the return track of the alley, means adapted to receive the pins from said removing means and to deliver them to the setter, and means for causing the setter to deposit the pins in playing position upon the alley bed.

21. In a pin setting machine for a bowling alley, the combination of a pin setter for setting pins in playing position upon the alley bed, means for clearing the alley of fallen pins after a ball has been rolled, and means for preventing relative movement of the standing pins during the operation of said clearing means.

22. In a pin setting machine for a bowling alley, the combination of a sweeper, and means for lifting the standing pins from the alley after a ball has been rolled to allow said sweeper to remove the fallen pins therefrom.

23. In a pin setting machine for a bowling alley, the combination of a pin setter, and means carried thereby for lifting the standing pins from the positions assumed thereby during the bowling operation and for returning the pins to the same positions.

24. In a pin setting machine for a bowling alley, the combination of a sweeper for removing pins from the alley bed, and means for lifting the standing pins from the positions assumed thereby during the bowling operation and for returning the pins to the same positions.

25. In a pin setting machine for a bowling alley, the combination of means for setting the pins, means for removing the pins lying upon the alley bed after a ball has been rolled along the alley, and means for lifting the standing pins from the alley before the action of the removing means and replacing them in position immediately thereafter.

26. In a pin setting machine for a bowling alley, the combination of means for setting the pins, means for removing the pins lying upon the alley bed after a ball has been rolled along the alley, means for lifting the standing pins from the alley prior to the action of the removing means and replacing them immediately thereafter, and electrically controlled means for timing the operation of the pin removing and the pin lifting means.

27. In a pin setting machine for a bowling alley, the combination of a movable pin setter adapted to set the pins in proper position upon the alley bed, means for removing the pins lying upon the alley bed after a ball has been rolled along the alley, and means movable with the said setter for lifting the standing pins from the alley bed before the action of the said pin removing means and for replacing them in position immediately thereafter.

28. In a pin setting machine for a bowling alley, the combination of a movable pin setter adapted to set the pins in proper position upon the alley bed, means for removing the pins lying upon the alley bed after a ball has been rolled along the alley, and means carried by the said setter for lifting the standing pins from the alley before the action of the said removing means and for replacing them in position immediately thereafter.

29. In a pin setting machine for a bowling alley, the combination of a pin setter adapted to set the pins in proper position upon the alley bed, means for removing the pins lying upon the alley bed after a ball has been rolled along the alley, and means secured beneath the said setter for picking up the standing pins from the alley bed before the action of the said removing means and for replacing them in position immediately thereafter.

30. In a pin setting machine for a bowling alley, the combination of a pin setter adapted to set the pins in proper position upon the alley bed, means for removing the pins lying upon the alley bed after a ball has been rolled along the alley, and a plurality of magnets fastened beneath the said setter for picking up the standing pins from the alley bed before the action of the said removing means and for replacing them in position immediately thereafter.

31. In a pin setting machine for a bowling alley, the combination of a pin setter adapted to set the pins in proper position upon the alley bed, means for removing the pins lying upon the alley bed after a ball has been rolled along the alley, a plurality of magnets fastened to the said setter adapted to pick up the standing pins from the alley bed before the action of the said removing means and to again deposit them in position immediately thereafter, and means for energizing the said magnets throughout a predetermined period.

32. In a pin setting machine for a bowling alley, means mechanically disconnected from the pins for lifting the standing pins on the alley bed in a vertical direction above said bed.

33. In a pin setting machine for a bowling alley, magnetic means for lifting the standing pins on the alley bed in a vertical direction above said bed.

34. In a pin setting machine for a bowling alley, vertically movable means to engage pins standing on the alley bed and lift them in a vertical direction and replace them on the alley bed.

35. In a pin setting machine for a bowling alley, reciprocating means to engage pins standing on the alley bed and lift them above the bed and replace them on the bed in the exact positions from which they were lifted.

36. In a pin setting machine for a bowling alley, the combination of a set of bowling pins each having an armature fastened to the top thereof, and means for lifting the pins above the bowling alley comprising magnets to contact with said armatures.

37. In a pin setting machine for a bowling alley, the combination of a set of bowling pins each having an armature fastened to the top thereof, and means for lifting the pins above the alley bed comprising a plurality of magnets positioned above the alley bed in conformity with the pin spots thereon to engage the armatures of the standing pins.

38. In a pin setting machine for a bowling alley, the combination of a set of bowling pins each provided with an armature fastened to the top thereof, a magnet for each pin located above the spot occupied by the pin when properly set on the alley bed, and means for moving said magnet vertically to engage the armature.

39. In a pin setting machine for a bowling alley, the combination of a bowling pin having an armature of relatively small superficial area secured to the top thereof, and a vertically movable magnet of relatively large superficial area to engage said armature.

40. In a pin setting machine for a bowling alley, the combination of a set of bowling pins each provided with an armature fastened to the top thereof, a plurality of magnets, one for each pin, each of greater superficial area than an armature and all located in the same horizontal plane and spaced apart to correspond with the position of the pins when properly spotted on the alley bed, and means for moving said magnets in a vertical direction to engage said armatures.

41. In a pin setting machine for a bowling alley, the combination of a set of bowling pins each provided with an armature fastened to the top thereof, a plurality of magnets, one for each pin, means for imparting a vertical movement to said magnets to engage the armatures and lift the pins from the alley bed and replace them thereon, means for energizing the said magnets at the time they engage said armatures for lifting the pins and for deënergizing the magnets after the pins have been replaced on the alley bed.

42. In a pin setting machine for a bowling alley, a pin setter adapted to receive a set of bowling pins and comprising guiding means to engage the pins at and above their shoulders.

43. In a pin setting machine for a bowling alley, a bodily movable pin setter adapted to receive a set of bowling pins and comprising guiding means to engage the pins at their heads.

44. In a pin setting machine for a bowling alley, a pin setter adapted to receive a set of pins and comprising guiding means to engage said pins at their shoulders and heads.

45. In a pin setting machine for a bowling alley, a pin setter adapted to receive a set of bowling pins and comprising a frame, and means mounted on the frame for engaging the pins at their shoulders and heads to guide them onto the spots on the alley bed.

46. In a pin setting machine for a bowling alley, a pin setter adapted to receive a set of bowling pins and comprising a frame, and means mounted on the frame to engage the shoulders and heads of the pins above the frame for guiding the pins onto the spots on the alley bed.

47. In a pin setting machine for a bowling alley, a reciprocable pin setter adapted to receive a set of pins and comprising movable guides to receive the pins in reclining position, a distributer for supplying pins in sets to said setter, and means for moving said guides to right the pins as the setter is lowered to set the pins upon the alley bed.

48. In a pin setting machine for a bowling alley, a reciprocable pin setter adapted to receive a set of pins and comprising a plurality of fixed and movable guides, said movable guides being normally disposed to receive the pins in reclining position, a distributer for supplying a set of pins to said setter, and means for moving the movable guides to right the pins between the fixed and movable guides.

49. In a pin setting machine for a bowling alley, a reciprocable pin setter adapted to receive a set of pins and comprising a plurality of fixed upright guides and pivoted guides arranged in complementary pairs, said pivoted guides being normally tilted to receive pins in reclining position, a distributer for supplying a set of pins to said setter, and means for swinging the pivoted guides on their pivots to carry the pins into upright position between the fixed and pivoted guides.

50. In a pin setting machine for a bowling alley, the combination of a vertically movable pin setter comprising members for receiving the pins in inclined position, automatically operated means for removing all of the pins from the alley bed, means for lowering the setter to set the pins on the alley bed, and means for raising the pin receiving members to upright position to permit the pins to pass through the setter into position upon the alley bed.

51. In a pin setting machine for a bowling alley, the combination of a vertically movable pin setter comprising means for supporting a set of pins in reclining position, automatically operated means for removing all of the pins from the alley bed prior to the movement of said setter, and means operable by the movement of the setter for righting the said supporting means at the lowermost point in the travel of the setter whereby the pins are raised to upright position and positioned upon the alley bed.

52. In a pin setting machine for a bowling alley, the combination of a vertically movable frame having a plurality of apertures through which a set of pins are adapted to be deposited in proper position upon the alley bed, a plurality of members pivotally mounted adjacent said apertures and normally positioned to receive a set of pins in reclining position, devices connecting said members, a lever fulcrumed in said frame and connected to said devices, and means for moving the lever to move the pin receiving members simultaneously to right the pins and permit them to pass through the apertures into proper position upon the alley bed.

53. In a pin setting machine for a bowling alley, the combination of a stationary element, a vertically movable frame provided with a plurality of apertures through which a set of pins may be deposited in proper position upon the alley bed, a plurality of members pivotally mounted adjacent the said apertures and normally adapted to receive a set of pins in reclining position, devices connecting said members, a lever fulcrumed in the frame and having an arm connected to said devices, and means connecting the other arm of said lever to the stationary element whereby said means is adapted to move said lever at a predetermined point in the travel of the frame to move the said members simultaneously to right the pins and permit them to pass through the apertures into proper position upon the alley bed.

54. In a pin setting machine for a bowling alley, the combination of a vertically movable frame provided with a plurality of apertures through which a set of pins is adapted to be deposited in proper position upon the alley bed, a plurality of members pivotally mounted adjacent said apertures and adapted to retain the pins in reclining position, devices connecting said members, a lever fulcrumed in said frame connected and adapted to actuate said devices, an element fixed against vertical movement, an element connected to said lever adapted to move vertically with said frame and telescoping with the first mentioned element, and coöperative stops upon said elements arranged to inter-engage when the frame reaches a predetermined point in its travel and cause the lever to be moved about its fulcrum to swing the members into upright position to deposit the pins through said apertures upon the alley bed.

55. In a pin setting machine for a bowling alley, the combination of a vertically movable frame provided with a plurality of apertures through which a set of pins is adapted to be deposited upon the alley bed, means for lifting pins standing on the alley bed, and means for positioning said lifting means beneath said apertures to lift the standing pins and for shifting said lifting means from beneath the said apertures when it is desired to position a new set of pins upon the alley bed.

56. In a pin setting machine for a bowling alley, the combination of a vertically movable frame provided with a plurality of apertures through which a set of pins is adapted to be delivered into proper position upon the bed, means located directly beneath said apertures for lifting the pins and replacing them in position upon the alley bed, and means for shifting said lifting means from beneath said apertures in the frame when it is desired to deposit a new set of pins upon the alley.

57. In a pin setting machine for a bowling alley, the combination of a vertically movable frame provided with a plurality of apertures through which a set of pins is adapted to be deposited upon the alley bed, means normally located beneath said apertures for lifting pins standing upon the alley bed to permit the removal of fallen pins, and means automatically operable by the vertical movement of the frame for shifting said lifting means from beneath said apertures when it is desired to deposit a new set of pins upon the alley bed and for returning the lifting means to normal position after a new set of pins is in position upon the alley bed.

58. In a pin setting machine for a bowling alley, the combination of a stationary element, a vertically movable frame provided with a plurality of apertures through which a set of pins is adapted to be deposited in proper position upon the alley bed, means carried by said movable frame and normally positioned beneath said apertures for lifting pins standing upon the alley bed to permit the removal of fallen pins, and means connected to said stationary element, the frame and the lifting means for automatically shifting the lifting means from beneath said apertures when said frame is moved to deposit a new set of pins upon the alley bed.

59. In a pin setting machine for a bowling alley, the combination of a stationary element, a vertically movable frame provided with a plurality of apertures through which a set of pins may be deposited in proper position upon the alley bed, means carried by the frame and normally positioned beneath the said apertures for lifting pins standing upon the alley bed to permit the removal of fallen pins, means for lowering the frame to position adjacent the tops of the standing pins when it is desired to lift the same from the alley bed and for lowering the frame to position adjacent the alley bed when it is desired to deposit a new set of pins thereon, and means connected to the said stationary element, movable frame and lifting means and operable by movement of the frame after it has been lowered beneath the height of pins standing upon the alley for shifting the said lifting means from beneath the said apertures to permit the pins to be set upon the alley bed.

60. In a pin setting machine for a bowling alley, the combination of a vertically movable frame having a plurality of apertures therethrough, means carried by the frame for holding a pin in reclining position adjacent each aperture, means carried beneath the frame and normally disposed beneath the said apertures for lifting pins standing upon the alley bed to permit the removal of fallen pins, and means operable by movement of the said frame for shifting said lifting means from beneath said apertures and for elevating the pin retaining means to right the pins carried by the frame and permit them to pass through the apertures into proper position upon the alley bed.

61. In a pin setting machine for a bowling alley, the combination of a vertically movable pin setter, means carried by said setter for lifting pins from the alley, and means for imparting to said setter a plurality of vertical movements, one of said movements disposing the setter adjacent the alley bed and another movement disposing the setter adjacent the tops of pins standing upon the alley bed.

62. In a pin setting machine for a bowling alley, the combination of a vertically movable pin setter adapted to deposit a set of pins in proper position upon the alley bed, and means for moving the setter into position to deposit pins comprising a lever connected to the setter, an actuating cam having a groove for oscillating said lever, and means carried by the cam for directing an end of the lever into said groove.

63. In a pin setting machine for a bowling alley, the combination of a vertically movable pin setter adapted to deposit a set of pins in proper position upon the alley bed, and means for moving the said setter to dispose it adjacent the alley bed, said means comprising a lever connected to the setter, an actuating cam normally at rest for oscillating said lever, and means for imparting a single revolution to the cam.

64. In a pin setting machine for a bowling alley, the combination of a vertically movable frame, means carried by the frame for lifting pins standing upon the alley bed and for depositing them again upon the alley bed, and means for imparting a plurality of vertical movements to the frame, said last mentioned means comprising a lever connected to the frame, an actuating cam having a pair of grooves in its face for oscillating the lever, and means for directing an end of said lever successively into said grooves.

65. In a pin setting machine for a bowling alley, the combination of a vertically movable frame, means carried by the frame for lifting pins standing upon the alley bed and for depositing them again upon the alley bed, and means for imparting to the frame a plurality of vertical movements, said last mentioned means comprising a lever connected to the frame, an actuating cam normally at rest for oscillating said lever, and means for imparting a single revolution to the cam.

66. In a pin setting machine for a bowling alley, the combination of a vertically movable pin setter to deposit a set of pins in proper position upon the alley bed, means carried by the setter for lifting pins standing upon the alley bed and for depositing them again upon the alley bed, and means for imparting to the setter a plurality of vertical movements, one of said movements disposing the said setter adjacent the alley bed and a plurality of said movements disposing said setter at the height of the tops of pins standing on the alley bed, said last mentioned means comprising a lever connected to the setter, and an actuating cam having a plurality of grooves in the face thereof in which an end of the lever is adapted to be disposed, one of said grooves governing the actuation of the setter when it is desired to deposit a new set of pins upon the alley, and a pair of grooves governing the actuation of the setter when it is desired to temporarily lift the standing pins from the alley bed, and means for directing the end of said lever into said groove or said pair of grooves.

67. In a pin setting machine for a bowling alley, the combination of a vertically movable pin setter adapted to deposit a set of pins in proper position upon the alley bed, means carried by the setter for lifting pins standing upon the alley bed and for depositing them again upon the alley bed, and means for imparting a plurality of vertical movements to the setter, one of said movements disposing the setter adjacent the alley bed and another of said movements disposing the setter at the height of the tops of pins standing on the alley bed, the last mentioned means comprising a lever connected to the setter, a cam normally at rest and provided with a plurality of grooves in its face into which an end of the lever is adapted to be directed, means for imparting to the cam a single revolution to actuate the setter to deposit a set of pins upon the alley bed or to lift and replace the standing pins, and means for directing said end of the lever into an appropriate groove to cause the setter to perform the desired operation.

68. In a pin setting machine for a bowling alley, the combination of a vertically movable pin setter adapted to deposit a set of pins in proper position upon the alley bed, means carried by the setter for lifting pins standing upon the alley bed and for depositing them again upon the alley bed, and means for imparting to the setter a plurality of vertical movements, one of said movements disposing the setter adjacent the alley bed and a plurality of said movements disposing the said setter at the height of the tops of pins standing on the alley bed, said last mentioned means comprising a lever connected to said setter, a continuously rotated shaft, a cam mounted thereon for oscillating said lever, a clutch for locking said cam to the shaft during one revolution of the shaft, and a magnet for throwing in the clutch.

69. In a pin setting machine for a bowling alley, the combination of a vertically movable pin setter adapted to deposit a set of pins in proper position upon the alley bed, means carried by the setter for lifting pins standing upon the alley bed and for depositing them again upon the alley bed, and means for imparting to the setter a plurality of vertical movements, one of said movements disposing the setter adjacent the alley bed and a plurality of said movements disposing the setter at the height of the tops of pins standing on the alley bed, said last mentioned means comprising a lever connected to the setter, a cam provided with a plurality of grooves in which an end of the lever is adapted to be directed, a finger at the forward end of each groove for directing said end of the lever into the groove, connections between said fingers whereby one of the fingers is normally maintained in open position and another in closed position, and means for shifting said connections between the fingers to close the open finger and open the closed finger.

70. In a pin setting machine for a bowling alley, the combination of a vertically movable pin setter adapted to deposit a set of pins in proper position upon the alley bed, means carried by the setter for lifting pins standing upon the alley bed and for depositing them again upon the alley bed, and means for imparting to the said setter a plurality of vertical movements, one of said movements disposing the setter adjacent the alley bed and a plurality of said movements disposing the setter at the height of the tops of pins standing on the alley bed, said last mentioned means comprising a lever connected to the setter, a cam provided with a plurality of grooves in which an end of the lever is adapted to be directed, a finger at the forward end of each groove for directing said end of the lever into the groove, connections between the fingers whereby one of the fingers is normally maintained in open position and another in closed position, a member for moving said connections to close the open finger and open the closed finger, retaining means for normally holding the said member in inoperative position, and a magnet for releasing said retaining means.

71. In a pin setting machine for a bowling alley, the combination of a sweeper and means for moving the sweeper along the alley bed, said means comprising a lever connected to the sweeper, and a cam for oscillating said lever.

72. In a pin setting machine for a bowling alley, the combination of a sweeper and means for moving the sweeper along the alley bed, said means comprising a lever connected to the sweeper, a cam for oscillating the lever, and means for imparting a single revolution to the cam.

73. In a pin setting machine for a bowling alley, the combination of a vertically movable pin setter adapted to deposit a set of pins in proper position upon the alley bed, a sweeper and means for moving the sweeper along the alley bed comprising a lever connected to the sweeper and a cam having a groove in its face into which an end of the lever is adapted to be directed, and means for directing said end of the lever into the groove at a predetermined instant whereby the sweeper may be moved along the alley bed preparatory to the movement of the setter to deposit a set of pins upon the alley bed.

74. In a pin setting machine for a bowling alley, the combination of a vertically movable pin setter, means for imparting a plurality of vertical movements to the setter, one of said movements disposing the setter in position to place a set of pins upon the alley bed, another of said movements disposing the setter in position to lift pins standing upon the alley bed, and a third movement to again deposit the standing pins in position upon the alley bed, a sweeper, and a mechanism connected to said setter operating means for moving the sweeper along the alley preparatory to the movement of the setter into position to deposit a set of pins upon the alley bed and between the movements of the setter into position to lift and replace the standing pins, said mechanism comprising a lever connected to the sweeper, a cam provided with a pair of grooves in its face into which an end of the lever is adapted to be directed to oscillate said lever and actuate the sweeper, and means for directing the end of the lever into the desired groove to actuate the sweeper.

75. In a pin setting machine for a bowling alley, the combination of a vertically movable pin setter, means for imparting a plurality of vertical movements to the setter, one of said movements disposing the setter in position to place a set of pins upon the alley bed, another of said movements disposing the setter in position to lift pins standing upon the alley bed, and a third movement to again deposit the standing pins in position upon the alley bed, a sweeper, and a mechanism connected to said setter operating means for moving the sweeper along the alley preparatory to the movement of the setter into position to deposit a set of pins upon the alley bed and between the movements of the setter into position to lift and replace the standing pins, said mechanism comprising a lever connected to the sweeper, a cam provided with a pair of grooves in its face into which an end of the lever is adapted to be directed to oscillate said lever and actuate the sweeper, and means for directing said end of the lever into one groove and preventing it entering the other groove to cause the sweeper to be actuated either preparatory to the movement of the setter in depositing a set of pins on the alley bed or intermediate the movements of the setter into position to lift and replace the standing pins.

76. In a pin setting machine for a bowling alley, the combination of a vertically movable pin setter, means for imparting a plurality of vertical movements to the setter, one of said movements disposing the setter adjacent the alley bed to deposit a set of pins thereon, and two of said movements disposing the setter in position to lift and replace standing pins, a sweeper, and means causing the sweeper to move along the alley before the movement of the setter to setting position and intermediate the lifting and replacing movements of the setter.

77. In a pin setting machine for a bowling alley, the combination of a vertically movable pin setter adapted to deposit a set of pins in proper position upon the alley bed, a sweeper, and means for moving said setter and sweeper, said means comprising a pair of levers one connected to the setter and the other to the sweeper, a setter actuating cam having a groove into which an end of the lever connected to the setter is adapted to be directed to lower the setter in setting the pins, a sweeper actuating cam having a groove into which an end of the lever connected to the sweeper is adapted to be directed to move the sweeper along the alley, means connecting the cams to cause the end of the lever connected to the sweeper to pass out of the groove of the sweeper cam before the end of the lever connected to the setter is in position to enter the said groove on the setter cam.

78. In a pin setting machine for a bowling alley, the combination of a vertically movable frame adapted to temporarily lift pins standing upon the alley bed after a ball has been rolled along the alley, a sweeper, and means for moving the said frame and sweeper, said means comprising a pair of levers, one connected to the frame and the other to the sweeper, a frame actuating cam having a pair of grooves into which an end of the lever connected to the frame is adapted to be directed to lower the frame to lift the standing pins and to lower it again to replace said pins, a sweeper actuating cam having a groove into which an arm of the lever connected to the sweeper is adapted to be directed to move the sweeper along the alley, and means connecting the said cams so that the end of the lever connected to the sweeper will be directed into the groove of the sweeper cam after the end of the lever connected to the frame has passed out of one of the grooves of the frame cam and before it enters the other.

79. In a pin setting machine for a bowling alley, the combination of a vertically movable pin setter adapted to deposit a set of pins in proper position upon the alley bed and to temporarily lift pins standing upon the alley bed, a sweeper, means for moving the setter and sweeper, said means comprising a lever connected to the setter, a lever connected to the sweeper, a setter actuating cam having one groove adapted to control the movement of the setter in depositing a set of pins upon the alley bed and a pair of grooves adapted to control the movement of the setter in temporarily lifting the standing pins, a sweeper actuating cam having two grooves therein one cooperating with the first mentioned groove of the setter cam and the other with its pair of grooves, means rigidly connecting the cams, and means for directing the ends of the levers through desired cooperating grooves in the cams.

80. In a pin setting machine for a bowling alley, the combination of a vertically movable pin setter adapted to deposit a set of pins in proper position upon the alley bed and to temporarily lift pins standing upon the alley bed, a sweeper, means for moving the setter and sweeper, said means comprising a lever connected to the setter, a lever connected to the sweeper, a setter actuating cam having one groove adapted to control the movement of the setter in depositing a set of pins upon the alley bed and a pair of grooves adapted to control the movement of the setter in temporarily lifting the standing pins, a sweeper actuating cam having two grooves therein, one cooperating with the first mentioned groove of the setter cam and the other with its pair of grooves, means rigidly connecting the cams, means for directing the ends of the levers through the desired cooperating grooves in the cams, the said directing means normally maintaining the grooves governing the movement of the sweeper and frame in open-position and also maintaining the grooves governing the temporary lifting of the standing pins and the sweeper in closed position, and a magnet for shifting the said directing means to open the latter grooves and close the former.

81. In a pin setting machine for a bowling alley, the combination of a vertically movable pin setter adapted to deposit a set of pins in proper position upon the alley bed and to temporarily lift pins standing upon the alley bed, a sweeper adapted to sweep the alley, and means actuating the setter and sweeper, said means comprising a constantly rotating shaft, a pair of cams rigidly connected together and loosely mounted on said shaft, connections between said cams and the setter and sweeper, and a clutch for locking said cams to the shaft throughout a single revolution of the shaft.

82. In a pin setting machine for a bowling alley, the combination of a vertically movable pin setter adapted to deposit a set of pins in proper position upon the alley bed and to temporarily lift pins standing upon the alley bed, a sweeper adapted to sweep the alley, and means actuating the setter and sweeper, said means comprising a constantly rotating shaft, a pair of cams rigidly connected together and loosely mounted on the shaft, connections between the cams and the setter and sweeper, a clutch for locking the cams to the shaft, and a magnet for actuating the clutch.

83. In a pin setting machine for a bowling alley, the combination of a vertically movable pin setter adapted to deposit a set of pins in proper position upon the alley bed and to temporarily lift pins standing upon the alley bed, a sweeper adapted to sweep the alley, and means actuating the setter and sweeper, said means comprising a constantly rotating shaft, a pair of cams rigidly connected together and loosely mounted on the shaft, connections between the cams and the setter and sweeper, a clutch for locking the cams to the shaft, a lever for actuating the clutch and having an arm engaging one of said cams to normally hold the clutch in inoperative position, and a magnet for moving the lever out of engagement with the cam to throw in the clutch.

84. The combination of a bowling alley pin setting machine, and movable means located in the alley pit to deliver pins from the pit into said machine.

85. The combination of a bowling alley pin setting machine, and a conveyer located in the alley pit to deliver pins from the pit into said machine.

86. In a pin setting machine for a bowling alley, the combination of a pin setter and means for removing pins from the alley pit, said means comprising a horizontally movable conveyer disposed in the alley pit and adapted to discharge the pins at the rear of the pit.

87. In a pin setting machine for a bowling alley, the combination of a pin setter adapted to set the pins in proper position upon the alley bed, means for transferring the pins to the setter, and movable means for delivering the pins from the alley pit into said transferring means.

88. In a pin setting machine for a bowling alley, the combination of a pin setter adapted to set the pins in proper position upon the alley bed, means for moving the pins from the alley bed into the alley pit, an assembly shelf, means for removing pins from the alley pit and depositing them upon the assembly shelf, and means for delivering pins from the assembly shelf to the pin setter.

89. In a pin setting machine for a bowling alley, the combination of a pin setter adapted to set the pins in proper position upon the alley bed, means for moving the pins from the alley bed into the alley pit, an assembly shelf, means for removing the pins from the alley pit and depositing them singly upon the assembly shelf, and means for delivering pins from the assembly shelf to the pin setter.

90. In a pin setting machine for a bowling alley, the combination of a pin setter adapted to set the pins in proper position upon the alley bed, means for moving the pins from the alley bed into the alley pit, an assembly shelf, means for removing pins from the alley pit and depositing them upon the assembly shelf, and means operable only when a full set of pins is collected upon the assembly shelf for delivering pins from the assembly shelf to the said pin setter.

91. In a pin setting machine for a bowling alley, the combination of a pin setter adapted to set the pins in proper position upon the alley bed, means for moving pins from the alley bed into the alley pit, an assembly shelf, means for removing the pins from the alley pit, means co-acting with the said removing means for conveying the pins to the assembly shelf, and means for delivering the pins from the assembly shelf to the pin setter.

92. In a pin setting machine for a bowling alley, the combination of a pin setter adapted to set the pins in proper position upon the alley bed, means for moving the pins from the alley bed into the alley pit, a horizontally movable conveyer for removing the pins from the alley pit, an assembly shelf, a vertically movable carrier co-acting with the horizontally movable conveyer for depositing the pins upon the assembly shelf, and means for delivering the pins from the assembly shelf to the pin setter.

93. In a pin setting machine for a bowling alley, the combination of a pin setter adapted to set the pins in proper position upon the alley bed, means for moving the pins from the alley bed into the alley pit, a continuously moving horizontal conveyer for removing the pins from the alley pit, an assembly shelf, a continuously moving vertical carrier co-acting with the said horizontal conveyer for depositing the pins upon the assembly shelf, and means for discharging the pins from the assembly shelf only when a full set has been collected thereon.

94. In a pin setting machine for a bowling alley, the combination of a pin setter adapted to set the pins in a proper position upon the alley bed, means for moving the pins from the alley bed into the alley pit, an elevating mechanism, an assembly mechanism to which the pins are delivered singly by the elevating mechanism, a distributer, means for discharging the pins from the assembly mechanism to the distributer and operable only when a full set of pins has been collected by the assembly mechanism, and means for discharging the pins from the distributer into the pin setter.

95. In a pin setting machine for a bowling alley, the combination of means for setting the pins, and means for conveying the pins from the alley pit to the setting means, said conveying means comprising a carrier mounted to travel in a vertical plane disposed transversely of the alley.

96. In a pin setting machine for a bowling alley, the combination of means for setting the pins, and means for conveying the pins from the alley pit to the setting means and for conveying the balls to the alley return track, said conveying means comprising an endless carrier disposed in a vertical plane transversely of the alley, a casing in which said carrier moves throughout a portion of its upward travel and having an opening intermediate of its ends, means for permitting the balls only to pass through said opening.

97. In a pin setting machine for a bowling alley, the combination of an endless vertically movable carrier for elevating pins and balls from the alley pit, a casing in which said carrier moves throughout a portion of its upward travel, an opening in said casing of a size insufficient to allow the passage of pins therethrough, and an incline between said opening and the alley return track for receiving a ball from said carrier and delivering it to the return track.

98. In a pin setting machine for a bowling alley, the combination of means for setting the pins, and means for conveying the pins from the alley pit to the setting means and for conveying the balls to the return track, said conveying means comprising an endless carrier disposed in a vertical plane, a casing in which said carrier moves throughout a portion of its travel, a door in the casing in position to be engaged by the balls and pins on the carrier, and a spring of sufficient strength to retain the door in closed position when a pin passes thereby but of insufficient strength to prevent its opening when a ball engages therewith.

99. In a pin setting machine for a bowling alley, the combination of an endless carrier to transfer the balls from the alley pit to the return track, and means for operating the carrier, said carrier having a plurality of flights cut away at the top thereof to provide recesses to accommodate the balls during the upward travel thereof.

100. In a pin setting machine for a bowling alley, the combination of an endless carrier to transfer the balls from the alley pit to the return track, and means for operating said carrier, said carrier having a plurality of flights cut away centrally at the top to provide recesses to accommodate the balls and prevent movement of the balls lengthwise of the flight during the upward travel of the flight.

101. In a pin setting machine for a bowling alley, the combination of a pin setter, and means for conveying the pins from the alley pit to the setter, said means comprising a casing, a carrier provided with a plurality of flights arranged to travel adjacent the casing, each of said flights having a flat upper face sloping toward the casing whereby a pin carried by said flight will be retained on the flight by engagement with the casing during the upward travel of the carrier.

102. In a pin setting machine for a bowling alley, the combination of a pin setter and means for conveying the pins from the alley pit to said setter and for conveying the balls to the alley return track, said means comprising a casing and a vertically movable carrier arranged to travel adjacent the casing during its upward travel and having a flight cut away centrally at its top to provide a recess sloping toward the casing for centering a pin or ball upon the flight and maintaining it in contact with the casing.

103. In a pin setting machine for a bowling alley, the combination of means for removing the balls from the alley pit, and means for conveying the balls from the said removing means to the alley return track, said conveying means comprising a casing and a vertically movable carrier having a pair of flights in adjacent relation, the lower flight being cut away at its top to provide a recess for centering a ball and the upper flight being cut away at its bottom to permit the ball carried by the first mentioned flight to roll out of the casing between the flights.

104. In a pin setting machine for a bowling alley, the combination of means for setting the pins, a distributer above said setting means for temporarily retaining a set of pins, and means for conveying the pins from the alley pit to said distributer, said conveying means, including an endless carrier adapted to elevate the pins, and a chute located adjacent the limit of the travel of the carrier for receiving the pins elevated by the carrier.

105. In a pin setting machine for a bowling alley, the combination of means for setting the pins, a distributer for temporarily retaining a set of pins, and means for conveying the pins from the alley pit to said distributer, said conveying means including a casing, a chute at the top of the casing, means for elevating the pins singly to the chute, and means for causing the pins to slide down the chute butt ends foremost.

106. In a pin setting machine for a bowling alley, the combination of means for setting the pins, a distributer for temporarily retaining a set of pins, and means for conveying the pins from the alley pit to said distributer, said conveying means including a casing, an endless carrier traveling adjacent the casing and adapted to elevate the pins in contact with the casing, the upper end of the casing being arranged with respect to the travel of the carrier to permit the pins to roll into and slide down the chute, and means in said chute to cause the pins to be delivered therefrom with their butt ends foremost.

107. In a pin setting machine for a bowling alley, the combination of means for setting the pins, and means for conveying the pins from the alley pit to the setting means, said conveying means comprising a casing, a chute disposed adjacent the upper end of the casing, an endless carrier traveling adjacent the casing and adapted to elevate the pins in contact with the casing, the upper end of the casing being curved and arranged with respect to the travel of the carrier to turn the pins end for end as they roll into the chute by contact of the small end of the pin with the curved edge of the casing when the pins are carried head ends foremost to cause the pins to pass down the chute butt ends foremost.

108. In a pin setting machine for a bowling alley, the combination of means for setting the pins, and means for conveying said pins from the alley pit to the setting means, said conveying means comprising a chute, means for lifting the pins into said chute, a shelf mounted at right angles to the chute, and means for moving the pins from the chute onto the shelf.

109. In a pin setting machine for a bowling alley, the combination of means for setting the pins, and means for conveying said pins from the alley pit to the setting means, said conveying means comprising a chute, means for lifting the pins into said chute, a shelf mounted at right angles to the chute, and means for moving the pins from the chute onto the shelf and for moving the pins carried by the shelf forwardly each time a pin is received upon the shelf.

110. In a pin setting machine for a bowling alley, the combination of means for setting the pins, and means for conveying the pins from the alley pit to the setting means, said conveying means comprising a chute for receiving the pins, means for lifting the pins into the chute, a shelf, and intermittently actuated means for moving the pins from the chute onto the shelf.

111. In a pin setting machine for a bowling alley, the combination of means for setting the pins, and means for conveying the pins from the alley pit to the setting means, said conveying means comprising a chute for receiving the pins, means for lifting the pins to the chute, a shelf, intermittently actuated means for moving the pins from the chute onto the shelf, and means carried by the chute in position to be engaged by the passing pins for controlling the operation of the intermittently actuating means.

112. In a pin setting machine for a bowling alley, the combination of means for setting the pins, and means for conveying the pins from the alley pit to the setting means, said conveying means comprising means for elevating the pins, a chute for receiving the pins from the elevating means, a shelf at the lower end of the chute, an endless conveyer for moving the pins onto the shelf, and means for imparting a step by step movement to the conveyer to advance the pins on the shelf a step for each pin received from the chute.

113. In a pin setting machine for a bowling alley, the combination of means for setting the pins, and means for conveying the pins from the alley pit to the setting means, said conveying means comprising a chute, means for delivering the pins to the top of the chute, a shelf adjacent the bottom of the chute, a leaf disposed across the chute in position to be moved by a pin as it slides down the chute, a mechanism for moving the pins from the chute onto the shelf, and connections between said leaf and said mechanism for causing the mechanism to be actuated every time a pin passes the leaf.

114. In a pin setting machine for a bowling alley, the combination of means for setting the pins, and means for conveying the pins from the alley pit to the setting means, said conveying means comprising a chute, means for delivering the pins to the top of the chute, a shelf adjacent the bottom of the chute, a leaf disposed across the chute in position to be moved by a pin as it slides down the chute, an endless conveyer, a wheel over which said conveyer is trained, a ratchet-wheel fixed with relation to said wheel, a reciprocating pawl adapted to engage the teeth of said ratchet-wheel and normally moving out of engagement therewith, and means for engaging said pawl with said ratchet-wheel every time a pin passes down the chute to advance the conveyer one step.

115. In a pin setting machine for a bowling alley, the combination of means for setting the pins, and means for conveying the pins from the alley pit to the setting means, said conveying means comprising a chute, means for delivering the pins to the top of the chute, a shelf adjacent the bottom of the chute, an endless conveyer, a wheel over which said conveyer is trained, a ratchet fixed with relation to said wheel, a reciprocating pawl adapted to engage the teeth of the ratchet and normally moving out of engagement therewith, and means located at the bottom chute for engaging the pawl with the ratchet every time a pin passes down the chute to advance the conveyer and move the pin onto the shelf.

116. In a pin setting machine for a bowling alley, the combination of means for setting the pins, and means for conveying the pins from the alley pit to the setting means, said conveying means comprising a vertically swinging shelf, means normally retaining said shelf in horizontal position, means for delivering the pins to said shelf, and means for releasing the shelf when a full set of pins has been collected thereon.

117. In a pin setting machine for a bowling alley, the combination of means for setting the pins, and means for conveying the pins from the alley pit to the setting means, said conveying means comprising a vertically swinging shelf, means for normally retaining the shelf in horizontal position, means for delivering the pins to one end of the shelf, means for advancing the pins upon the shelf each time a pin is delivered thereto, and means located at the end of the shelf distant from its receiving end for releasing the shelf when a full set of pins has been assembled upon the shelf.

118. In a pin setting machine for a bowling alley, the combination of means for setting the pins, and means for conveying the pins from the alley pit to the setting means, said conveying means comprising a vertically swinging shelf, means for normally retaining the shelf in horizontal position, means for delivering a set of pins singly to the shelf, a distributer beneath the shelf and above the setting means, a plurality of inclined chutes each having an end disposed in a desired position above the distributer and an end adjacent the swinging shelf, and means for releasing the shelf to permit the pins carried thereby to slide off the shelf and into and down the chutes into the distributer.

119. In a pin setting machine for a bowling alley, the combination of a pin setter adapted to set the pins in proper position upon the alley bed, a distributer above the setter adapted to contain a set of pins and to deliver the same to the setter, a support for sustaining the pins in the distributer, and means for moving said support to permit the pins to pass into the setter.

120. In a pin setting machine for a bowling alley, the combination of a pin setter adapted to set the pins in proper position upon the alley bed, a distributer above the setter adapted to contain a set of pins and to deliver the same to the setter, said distributer comprising a frame having longitudinal and transverse members forming apertures, a support beneath said apertures for supporting the pins in the frame, and means for moving the support to permit the pins to be delivered to the setter.

121. In a pin setting machine for a bowling alley, the combination of a pin setter adapted to set the pins in proper position upon the alley bed, a distributer above the setter adapted to contain a set of pins and to deliver the same to the setter, said distributer comprising a frame having transverse and horizontal members forming apertures, a support slidably mounted beneath the frame and normally positioned to support a set of pins in said apertures, and means for moving said support laterally from beneath the pins to permit them to pass into the setter.

122. In a pin setting machine for a bowling alley, the combination of a pin setter adapted to set the pins in proper position upon the alley bed, a distributer above the setter adapted to contain a set of pins and to deliver the same to the setter, said distributer comprising a frame, a support slidably mounted beneath the frame and normally positioned to support the pins therein, a continuously oscillating element, and means for connecting said element to said support to move the latter from beneath said pins to permit them to pass into the setter.

123. In a pin setting machine for a bowling alley, the combination of a pin setter adapted to set the pins in proper position upon the alley bed, a distributer above the setting means adapted to contain a set of pins and to deliver the same to the setter, said distributer comprising a frame, a support slidably mounted beneath the frame and normally in position to support the pins, actuating means for reciprocating the support to permit the pins to be delivered to the setter and to return the support to normal position, and means rendering said actuating means inoperable when a set of pins is positioned in the setter.

124. In a pin setting machine for a bowling alley, the combination of a pin setter adapted to set the pins in proper position upon the alley bed, a distributer above the setter adapted to contain a set of pins and to deliver the same to the setter, said distributer comprising a frame, a support slidably mounted beneath the frame and normally in position to support the pins, actuating means for reciprocating said support to permit the pins to be delivered to the setter and to return the support to normal position, and means rendering said actuating means inoperable except when a set of pins is carried by said frame.

125. In a pin setting machine for a bowling alley, the combination of a pin setter adapted to set the pins in proper position upon the alley bed, a distributer above the setter adapted to contain a set of pins and to deliver the same to the setter, said distributer comprising a frame adapted to contain a set of pins, a support slidably mounted beneath the frame and normally in position to support the pins, actuating means for reciprocating said support to permit the pins to be delivered to the setter and to return the support to normal position, and means rendering said actuating means operable only when a set of pins is positioned in the frame and the setter is empty.

126. In a pin setting machine for a bowling alley, the combination of a pin setter adapted to set the pins in proper position upon the alley bed, a distributer above the setter adapted to contain a set of pins and to deliver the same to the setter, said distributer comprising a frame, a support slidably mounted beneath the frame and normally in position to support the pins, means for moving the support from beneath the pins to permit the pins to be delivered to the setter, and a magnet for operatively connecting said moving means to said support.

127. In a pin setting machine for a bowling alley, the combination of a pin setter adapted to set the pins in proper position upon the alley bed, a distributer above the setter adapted to contain a set of pins and to deliver the same to the setter, said distributer comprising a stationary frame, a support slidably mounted beneath the frame and normally positioned to support the pins and having an arm provided with a slot extending in the direction of movement of the support, a continuously oscillating finger disposed in said slot, and means for fastening said finger to the said arm throughout one oscillation of the finger to move the support from beneath the pins.

128. In a pin setting machine for a bowling alley, the combination of a pin setter adapted to set the pins in proper position upon the alley bed, a distributer above the setter adapted to contain a set of pins and to deliver the same to the setter, said distributer comprising a stationary frame, a support slidably mounted beneath the frame and normally positioned to support the pins and having an arm provided with a slot extending in the direction of movement of the support, a continuously oscillating finger disposed in the slot, a locking device and a stop mounted on the arm adjacent an end of the slot, yielding means for moving the locking device over the slot, a member normally interposed between the locking device and the stop for holding the device away from the slot, and means for withdrawing said member to permit the locking device to protrude across the slot to engage the finger and move the support from beneath the said pins.

129. In a pin setting machine for a bowling alley, the combination of a pin setter adapted to set the pins in proper position upon the alley bed, a distributer above the setter adapted to contain a set of pins and to deliver the same to the setter, said distributer comprising a stationary frame, a support slidably mounted beneath the frame and normally positioned to support the pins and having an arm provided with a slot extending in the direction of movement of the support, a continuously oscillating finger disposed in said slot, a locking device and a stop mounted on the arm adjacent an end of the slot, yielding means for moving the locking device over the slot, a member interposed between the locking device and the stop for holding the locking device away from the slot, and a magnet for withdrawing the said member from between the device and the stop to permit the device to protrude across the slot to engage the finger and move the support from beneath the said pins.

130. In a pin setting machine for a bowling alley, the combination of a set of pins having armatures in their heads, a movable frame, a plurality of magnets secured to the frame for lifting pins standing on the alley preparatory to the removal of fallen pins and for replacing them in proper position immediately thereafter, a source of electrical energy, means for connecting said magnets to said source of electrical energy immediately before the standing pins are lifted and for disconnecting the magnets from said source of electrical energy when it is desired to return these pins to the alley bed, said means comprising an electric circuit, a switch in said circuit, means for positively retaining the switch in open position except when the frame is being moved to dispose the magnets adjacent the armatures in the heads of the standing pins, and means for preventing the closing of the switch during this movement of the frame until the magnets are in proper position.

131. In a pin setting machine for a bowling alley, the combination of a set of pins having armatures in their heads, a pin setter, a plurality of magnets carried beneath the setter, means for imparting a plurality of vertical movements to the setter, one of said movements disposing the setter adjacent the alley bed, and a pair of said movements disposing the magnets carried by the setter immediately above the armatures in the heads of pins standing upon the alley to permit the magnets to temporarily remove said pins, means for energizing said magnets and comprising a source of electrical energy, a circuit connecting the magnets with said source, a switch in said circuit, means for preventing the closing of the switch throughout the movement of the setter to position a new set of pins upon the alley, and means for preventing the closing of said switch except during a predetermined portion of the movements of the setter which dispose the magnets above the standing pins.

132. In a pin setting machine for a bowling alley, the combination of a set of pins having armatures in their heads, a pin setter adapted to set the pins in proper position upon the alley bed, a plurality of magnets carried beneath the setter, means for imparting a plurality of vertical movements to the setter, one of said movements disposing said setter adjacent the alley bed, and a pair of said movements disposing the magnets carried by the setter immediately above the heads of the pins standing upon the alley to permit the magnets to temporarily remove said pins, and means for energizing said magnets, said means comprising a source of electrical energy, a circuit connecting the magnets to said source, a switch in said circuit, a magnet separately connected to said source, an element normally maintaining the switch in open position and releasable when said last mentioned magnet is energized, and connections whereby said last mentioned magnet is energized to impart to the setter the pair of movements disposing the magnets above the heads of the standing pins.

133. In a pin setting machine for a bowling alley, the combination of a pin setter adapted to set the pins in proper position upon the alley bed, means for actuating the setter, a magnet for controlling said actuating means, a source of electrical energy, a circuit connecting said source and said magnet, a switch in said circuit, and means in said circuit for interrupting the flow of current when the setter is empty to prevent actuation of the setter.

134. In a pin setting machine for a bowling alley, the combination of a vertically movable pin setter adapted to set the pins in proper position upon the alley bed, means for actuating the setter, a magnet for controlling the actuating means, a source of electrical energy, a circuit connecting the magnet and said source, a switch in said circuit, means for interrupting said circuit when the setter is empty, and means for interrupting said circuit when the setter is out of elevated position.

135. In a pin setting machine for a bowling alley, the combination of a pin setter adapted to set the pins in proper positions upon the alley bed, means for controlling and timing the action of the setter, a magnet for starting said controlling and timing means, and an electrical circuit for energizing the magnet, said circuit comprising a source of electrical energy, a switch, a conductor leading from the switch through said magnet to the said source, a second conductor leading from the switch to said source, one of said conductors passing to said setter and adapted to be interrupted by movement of the setter from upper position to break the circuit.

136. In a pin setting machine for a bowling alley, the combination of a vertically movable pin setter adapted to set the pins in proper position upon the alley bed, means for controlling and timing the action of the setter, a magnet for starting said controlling and timing means, an electrical circuit for energizing the magnet, said circuit comprising a source of electrical energy, a switch, a pair of conductors leading from the switch to said source of electrical energy, one of said conductors passing through said magnet, and one of said conductors being interrupted and having an intermediate end connected to a terminal mounted on a relatively fixed part of the pin setting machine and the other intermediate end connected to a terminal carried by the pin setter, the said terminals contacting when the setter is in upper position to complete the circuit.

137. In a pin setting machine for a bowling alley, the combination of a pin setter adapted to set the pins in proper position upon the alley bed, a distributer above said setter adapted to contain a set of pins, means for causing the distributer to deliver its pins to the pin setter, a magnet for controlling said means, a source of electrical energy, a circuit for connecting the magnet and the source, and means for interrupting the circuit while there are pins in the setter to prevent the distributer from delivering additional pins to the setter.

138. In a pin setting machine for a bowling alley, the combination of a pin setter adapted to set the pins in proper position upon the alley bed, a distributer above said setter adapted to contain a set of pins, means for causing the distributer to deliver the pins to the setter, a magnet for controlling said means, a source of electrical energy, a circuit connecting said source to said magnet, and means for interrupting the circuit while there are pins in the setter, said last mentioned means comprising a fixed terminal, a movable terminal mounted in the setter and normally in contact with the fixed terminal, and an element bearing upon the movable terminal adapted to press it out of contact with the fixed terminal when pins are carried by the setter.

139. In a pin setting machine for a bowling alley, the combination of a pin setter adapted to set the pins in proper position upon the alley bed, a distributer above said setter adapted to contain a set of pins, means for causing the distributer to deliver its pins to the setter, a magnet for controlling said means, a source of electrical energy, a circuit for connecting the magnet and the source, and means for interrupting said circuit while the setter is out of elevated position to prevent pins from being delivered to the setter when the setter is out of elevated position.

140. In a pin setting machine for a bowling alley, the combination of a pin setter adapted to set the pins in proper position upon the alley bed, a distributer above said setter adapted to contain a set of pins, means for causing the distributer to deliver its pins to the setter, a magnet for controlling said means, a source of electrical energy, a circuit for connecting the magnet and the source, and means for interrupting the circuit while the movable frame is out of upper or normal position, said last mentioned means comprising a terminal carried by the setter, and a terminal carried by the distributer in position to contact with the terminal on the setter when the setter is in upper or normal position.

141. In a pin setting machine for a bowling alley, the combination of a pin setter adapted to set the pins in proper position upon the alley bed, a distributer above said setter adapted to contain a set of pins, means for causing said distributer to deliver its pins to the setter, a magnet for controlling said means, a source of electrical energy, a circuit for connecting the magnet and the source, and means for interrupting the circuit while the distributer is empty, said last mentioned means comprising a fixed terminal carried by the distributer, a yielding terminal also carried by the distributer and normally out of contact with the fixed terminal and adapted to be depressed into contact therewith by the weight of a set of pins carried in the distributer.

142. In a pin setting machine for a bowling alley, the combination of a pin setter adapted to set the pins in proper position upon the alley bed, a distributer above the setter adapted to contain a set of pins, means for causing the said distributer to deliver its pins to the said setter, and an electric circuit for controlling said means, said circuit comprising a source of electrical energy, a magnet, a pair of terminals mounted on the distributer, a conductor leading from the source of energy to the magnet, a conductor leading from the magnet to one of said terminals, a conductor leading from the other terminal to the source of energy, a pair of terminals carried by the setter in position to contact with the terminals on the distributer, a pair of conductors leading from the terminals on the setter to a switch carried by said setter, and means for maintaining the switch in open position when pins are resting in the setter and for closing the switch when the setter has positioned the pins on the alley.

143. In a pin setting machine for a bowling alley, the combination of a vertical movable pin setter adapted to set the pins in proper position upon the alley bed, a sweeper, means carried by the setter for lifting pins standing upon the alley preparatory to the action of the sweeper and for replacing them immediately thereafter, means for controlling and timing the movements of the setter and sweeper, said means being normally arranged to first actuate the sweeper and subsequently lower the setter to position a new set of pins upon the alley, a magnet for re-arranging said controlling means to lower the setter to lift the standing pins and then to actuate the sweeper and subsequently to again lower the setter to replace the standing pins on the alley bed, a second magnet for starting said controlling means, and an electric circuit for energizing both magnets, said circuit comprising a source of electric energy, a switch, a pair of conductors connecting the switch with the source of electrical energy, one of said conductors passing through both magnets, and means interposed in one of the conductors for interrupting the circuit when the setter is out of elevated position.

144. In a pin setting machine for a bowling alley, the combination of a pin setter for setting pins on the alley bed, mechanism for lifting standing pins from the alley bed, mechanism for sweeping pins from the alley into the alley pit and having two operations, one to clear the alley for setting pins and the other to sweep fallen pins from the alley after standing pins have been lifted from the alley bed, and electrical operating means comprising two switches located adjacent the player's position, one switch to control the operation of the sweeper and setter for setting pins and the other switch to control the operation of the pin lifting mechanism and the sweeper.

145. In a bowling alley, the floor of the pit comprising an endless belt conveyer to remove the pins and balls.

146. In a bowling alley pin setting apparatus, an elevator for conveying the pins and balls from the alley comprising a casing, and an endless chain conveyer in said casing having shelves that form pockets with the inner surface of the casing to hold the pins and balls.

147. In a bowling alley, means to raise the set pins from the alley, and means to clear the alley of down pins.

148. In a bowling alley pin setting apparatus, a dead wood sweep comprising a frame pivotally mounted and movable downwardly in the direction of the alley bed, a lever for operating the sweep, and mechanism for actuating the lever.

149. In a pin setting machine for a bowling alley, the combination of a pin setter adapted to receive and hold pins in reclining position above an alley bed, automatic means for depositing the pins in said setter, and means for righting the pins and causing the setter to deposit the pins in proper position upon the alley bed.

150. In a pin setting machine for a bowling alley, the combination of a pin setter normally sustained in elevated position above the pin end of the alley bed, automatic means for taking the pins from the alley pit and delivering them onto said setter, said means including a distributer adapted to hold a set of pins, distributed in accordance with their arrangement upon the alley bed, above said setter, and means for operating the setter to set the pins in proper position on the alley bed.

151. In a pin setting machine for a bowling alley, the combination of a pin setter normally sustained in elevated position above the pin end of the alley bed, automatic means for taking the pins from the alley pit and delivering them onto said setter, said means including a distributer adapted to hold a set of pins, distributed in accordance with their arrangement upon the alley bed, above said setter, and means for assembling a set of pins in proper position for delivery to said distributer.

152. In a pin setting machine for a bowling alley, the combination of a pin setter for setting the pins in proper position upon the alley bed including means for raising the pins left standing after a ball has been rolled, and means for removing the pins lying upon the alley after a ball has been rolled.

153. In a pin setting machine for a bowling alley, the combination of a vertically movable pin setter comprising members for receiving the pins in reclining position, means for removing all of the pins from the alley bed, means for lowering the setter to set the pins on the alley bed, and means for raising the pin receiving members to upright position to permit the pins to pass through the setter into position upon the alley bed.

154. In a pin setting machine for a bowling alley, the combination of a vertically movable pin setter comprising means for supporting a set of pins in reclining position, means for removing all of the pins from the alley bed prior to the movement of said setter, and means operable by the movement of the setter for righting the said supporting means at the lowermost point in the travel of the setter whereby the pins are raised to upright position and positioned upon the alley bed.

155. In a bowling alley pin setting apparatus, mechanism for setting the pins, and an elevator comprising a casing and shelves having sloping faces which form pockets with the inner surface of the casing for conveying the pins from the alley to be delivered to the pin setting mechanism.

156. In a bowling alley pin setting apparatus, mechanism for setting the pins, mechanism for delivering the pins to said setting mechanism, and an elevator for conveying the pins to said delivering mechanism comprising a casing, and shelves having sloping faces which form pockets with the inner surface of the casing.

157. In a bowling alley, mechanism to clear the pit of pins and balls, a pin setter, an assembling magazine, and automatic means to convey the pins from the pit to the assembling magazine.

158. In a pin setting machine for a bowling alley, the combination of a pin setter including means adapted to receive and hold pins in reclining position, automatic means for taking the pins from the alley pit and delivering them onto said setter, said means comprising a carrier for elevating the pins from the pit, and means for operating the setter to set the pins in proper position on the alley bed.

159. In a pin setting machine for a bowling alley, the combination of a pin setter and means for operating the same, and means normally disposed above the plane of the tops of the pins on the alley bed and adapted to move always in a direction parallel to the alley for sweeping the alley bed to remove pins therefrom.

160. In a pin setting machine for a bowling alley, the combination of a pin setter including means adapted to receive and hold pins in reclining position above an alley bed, means for removing the pins from the alley bed into the alley pit, means for removing both the pins and the bowling balls from the pit, means for delivering the balls upon the return track of the alley and the pins to the setter, and means for causing the setter to deposit the pins in proper position upon the alley bed.

161. In a pin setting machine for a bowling alley, the combination of means for setting the pins including means adapted to receive and hold pins in reclining position, and means for conveying the pins from the alley pit to the setting means, said conveying means comprising an endless carrier adapted to elevate the pins, and a single inclined chute located adjacent the limit of the upward travel of the carrier for receiving pins elevated by the carrier.

162. In a pin setting machine for a bowling alley, the combination of means for setting the pins including means adapted to receive and hold pins in reclining position, and means for conveying the pins from the alley pit to the setting means, said conveying means comprising a casing, a single inclined chute at the top of the casing, means for elevating the pins singly to the chute, and means for causing the pins to slide down the chute butt ends foremost.

163. In a pin setting machine for a bowling alley, the combination of means for setting the pins including means adapted to receive and hold pins in reclining position, and means for conveying the pins from the alley pit to the setting means, said conveying means comprising a casing, an endless carrier including members having inclined faces traveling adjacent the casing and adapted to elevate the pins in contact with the casing, a single inclined chute, the upper end of the casing being arranged with respect to the travel of the carrier to permit the pins to roll into and slide down the chute, and means in said chute to cause the pins to be delivered therefrom with their butt ends foremost.

164. In a pin setting machine for a bowling alley, the combination of a pin setter including means adapted to receive and hold pins in reclining position, means normally disposed above the plane of the tops of the pins on the alley bed and adapted to move always in a direction parallel to the alley for clearing the alley preparatory to the action of said setter, and means for bringing the setter into operation after the movement of the clearing means.

165. In a pin setting machine for a bowling alley, the combination of a sweeper normally disposed above the plane of the tops of the pins on the alley bed and adapted to clear the alley bed and movable always in a direction parallel to the alley, a pin setter adapted to place a set of pins in position upon the alley bed, and means for moving said sweeper rearwardly over the alley bed and back to normal position and for moving said setter into position adjacent the alley bed to deposit a set of pins, said means causing the setter to move into position adjacent the alley bed after the sweeper has returned to normal position after clearing the alley.

166. In a pin setting machine for a bowling alley, the combination of a sweeper normally disposed above the plane of the tops of the pins on the alley bed and movable always in a direction parallel to the alley to clear the alley, and a pin setter adapted to receive and hold pins in reclining position above the alley bed and having a movement into position to deposit the pins and a return movement, the movement of the setter into position to deposit the pins occurring after the return movement of the sweeper.

167. In a pin setting machine for a bowling alley, a distributer adapted to hold a set of pins and comprising a fixed support, means slidably connected thereto and normally disposed beneath the positions assumed by the pins, and means for moving said slidably connected means to release the pins from said distributer.

168. In a pin setting machine for a bowling alley, a vertically reciprocable setter comprising a frame and means movably secured to said frame to receive a set of pins, and automatic means to deliver pins in sets to said setter.

169. In a pin setting machine for a bowling alley, a vertically reciprocable setter comprising a frame and means movably secured to said frame to receive a set of pins, automatic means to deliver pins in sets to said setter, and automatic means to lower said setter and release the pins therefrom.

170. In a pin setting machine for a bowling alley, the combination of means for setting the pins, and means for conveying the pins from the alley pit to the setting means, said conveying means comprising a vertically swinging shelf, means normally retaining the shelf in pin-receiving position, means for delivering the pins to said shelf, and means operable by the pins when a full set is assembled for releasing said retaining means.

171. In a pin setting machine for a bowling alley, the combination of a pin setter, means normally disposed above the plane of the tops of the pins on the alley bed and adapted to move always in a direction parallel to the alley to sweep pins therefrom, and means for operating said setter and sweeper, the sweeper in advance of the setter.

172. In a pin setting machine for a bowling alley, mechanism to clear the pit of pins and balls, a pin setter, an independent assembling magazine adapted to support a set of pins, and automatic means to convey the pins from the pit to the assembling magazine.

173. In a pin setting machine for a bowling alley, mechanism for setting the pins, an independent assembling magazine adapted to support a set of pins, a conveyer to carry the pins to the assembling magazine, and means to deliver the pins to the conveyer.

174. In a pin setting machine for a bowling alley, mechanism for setting the pins, independent assembling mechanism adapted to support a set of pins, a conveyer to carry the pins to the assembling mechanism, and mechanism utilizing the differences in weight of the opposite ends of a pin to always throw the pin on the conveyer butt end foremost.

175. In a bowling alley pin setting apparatus, mechanism for setting the pins, and an elevator comprising a casing and shelves having sloping faces which form pockets with the inner surface of said casing for conveying the pins from the alley to be delivered to the pin setting mechanism.

176. In a bowling alley pin setting apparatus, mechanism for setting the pins, mechanism for delivering the pins to said setting mechanism, and an elevator comprising a casing and shelves having sloping faces which form pockets with the inner surface of said casing for conveying the pins to said delivering mechanism.

177. In a bowling alley, mechanism to clear the pit of pins and balls, a pin setter, an assembling magazine adapted to support a set of pins, and automatic means to convey the pins from the pit to the assembling magazine.

178. In a bowling alley pin setting apparatus, mechanism for setting the pins, an assembling magazine adapted to support a set of pins, a conveyer to carry the pins to the assembling magazine, and means to deliver the pins to the conveyer in a uniform position.

179. In a pin setting machine for a bowling alley, the combination of a pin setter adapted to receive and hold pins in horizontal position and normally sustained in elevated position above the pin end of the alley bed, automatic means for taking the pins from the alley pit and delivering them onto said setter, and means for operating the setter to right the pins and set them in proper position on the alley bed.

180. In a pin setting machine for a bowling alley, the combination of a pin setter normally sustained in elevated position above the pin end of the alley bed, including means adapted to receive and hold pins in horizontal position, automatic means for taking the pins from the alley bed and delivering them onto said setter, said means including a carrier for elevating the pins from the pit, and means for operating the setter to set the pins in proper position on the alley bed.

181. In a pin setting machine for a bowling alley, the combination of a pin setter, means for operating the same, and means normally disposed above the plane of the tops of the pins on the alley bed and adapted to move always in a direction parallel to the alley for sweeping the alley bed to remove pins therefrom.

182. In a pin setting machine for a bowling alley, the combination of a pin setter, means normally disposed above the plane of the tops of the pins on the alley bed and adapted to move always in a direction parallel to the alley bed to sweep pins therefrom, and means for operating said setter and sweeper, the sweeper in advance of the setter.

183. In a pin setting machine for a bowling alley, the combination of a pin setter, including means adapted to receive and hold pins in horizontal position above the alley bed, means for removing the pins from the alley bed into the pit, means for removing both the pins and the bowling balls from the pit, means for delivering the balls upon the return track of the alley and the pins to the setter, and means for causing the setter to deposit the pins in proper position upon the alley bed.

ERNEST HEDENSKOOG.

Witnesses:
MILTON T. MILLER,
FRANKLIN M. WARDEN.